United States Patent [19]
Branson et al.

[11] Patent Number: 6,049,665
[45] Date of Patent: Apr. 11, 2000

[54] OBJECT ORIENTED FRAMEWORK MECHANISM FOR ORDER PROCESSING INCLUDING PRE-DEFINED EXTENSIBLE CLASSES FOR DEFINING AN ORDER PROCESSING ENVIRONMENT

[75] Inventors: Michael John Branson; William Robert Taylor, both of Rochester, Minn.

[73] Assignee: International Business Machines Corporation, Armonk, N.Y.

[21] Appl. No.: 09/116,005

[22] Filed: Jul. 15, 1998

Related U.S. Application Data

[62] Division of application No. 08/729,206, Oct. 15, 1996.

[51] Int. Cl.⁷ ........................................................ G06F 9/45
[52] U.S. Cl. ............................................ 395/702; 707/103
[58] Field of Search ............................... 395/702, 200.13; 707/6, 103; 714/46

[56] References Cited

U.S. PATENT DOCUMENTS

| | | | |
|---|---|---|---|
| 4,943,932 | 7/1990 | Lark et al. ............................... | 706/60 |
| 5,057,996 | 10/1991 | Cutler et al. ........................... | 709/106 |
| 5,101,364 | 3/1992 | Davenport et al. .................... | 345/328 |
| 5,119,475 | 6/1992 | Smith et al. ........................... | 345/353 |
| 5,181,162 | 1/1993 | Smith et al. ........................... | 707/530 |
| 5,195,172 | 3/1993 | Elad et al. .............................. | 706/62 |
| 5,226,161 | 7/1993 | Khoyi et al. ........................... | 709/303 |
| 5,247,693 | 9/1993 | Bristol .................................... | 395/705 |
| 5,249,270 | 9/1993 | Stewart et al. ......................... | 709/222 |
| 5,257,384 | 10/1993 | Farrand et al. ........................ | 710/105 |
| 5,261,080 | 11/1993 | Khoyi et al. ........................... | 710/65 |
| 5,274,572 | 12/1993 | O'Neill et al. ......................... | 702/57 |
| 5,276,775 | 1/1994 | Meng ...................................... | 706/51 |
| 5,287,447 | 2/1994 | Miller et al. ........................... | 345/342 |
| 5,293,470 | 3/1994 | Birch et al. ............................ | 345/435 |
| 5,297,283 | 3/1994 | Kelly, Jr. et al. ...................... | 709/104 |
| 5,315,703 | 5/1994 | Matheny et al. ...................... | 345/507 |
| 5,367,624 | 11/1994 | Cooper ................................... | 345/357 |
| 5,367,633 | 11/1994 | Matheny et al. ...................... | 345/514 |
| 5,369,766 | 11/1994 | Nakano et al. ........................ | 709/305 |
| 5,379,430 | 1/1995 | Nguyen .................................. | 707/3 |
| 5,388,264 | 2/1995 | Tobias, II et al. ..................... | 707/103 |
| 5,390,325 | 2/1995 | Miller .................................... | 714/38 |
| 5,396,626 | 3/1995 | Nguyen .................................. | 395/701 |
| 5,398,336 | 3/1995 | Tantry et al. .......................... | 707/103 |
| 5,423,041 | 6/1995 | Burke et al. ........................... | 395/705 |
| 5,444,632 | 8/1995 | Kline et al. ............................ | 700/100 |
| 5,504,892 | 4/1996 | Atsatt et al. ........................... | 707/103 |
| 5,548,756 | 8/1996 | Tantry et al. .......................... | 707/10 |

(List continued on next page.)

OTHER PUBLICATIONS

Text of IBM Technical Disclosure Bulletin, vol. 37, DeBinder et al., Feb. 1994, "Results Folder Framework", pp. 431–432.

(List continued on next page.)

*Primary Examiner*—Tariq R. Hafiz
*Assistant Examiner*—Hoang-Vu Antony Nguyen-Ba
*Attorney, Agent, or Firm*—Martin & Associates, LLC; Derek P. Martin

[57] ABSTRACT

An object oriented framework mechanism provides a straightforward and convenient way to implement an order processing system for a manufacturing environment. The order processing framework includes an order class and an order item class that are core classes, and several classes that are extensible according to the needs of the user. The core classes and class relationships define the core function of the framework mechanism. Extensible classes include a configuration process class, an order input class, an order output class, an exploder class, a validator class, a link generator class, and a test data class. These extensible classes are extended by a programmer to implement a desired order processing environment. The framework provides consistent programmer interfaces over a wide variety of different production environments, which greatly enhances programmer efficiency and which makes the resultant code much easier to maintain.

47 Claims, 29 Drawing Sheets

U.S. PATENT DOCUMENTS

| | | | |
|---|---|---|---|
| 5,581,761 | 12/1996 | Radia et al. | 395/702 |
| 5,668,998 | 9/1997 | Mason et al. | 395/701 |
| 5,745,675 | 4/1998 | Herbig et al. | 714/46 |
| 5,768,505 | 6/1998 | Gilchrist et al. | 395/200.31 |
| 5,778,378 | 7/1998 | Rubin | 707/103 |
| 5,787,425 | 7/1998 | Bigus | 707/6 |
| 5,864,866 | 1/1999 | Henckel et al. | 707/103 |

OTHER PUBLICATIONS

Text of IBM Technical Disclosure Bulletin, vol. 36, Coskun, N., Jun. 1993, "Persistent Framework Independent Record/Playback Framework", pp. 261–264.

Text of IBM Technical Disclosure Bulletin, Baker et al., Oct. 1991, "Model View Schema", pp. 321–322.

Text of IBM Technical Disclosure Bulletin, Baker et al., Oct. 1991, "Office Container Class", pp. 309–310.

Text of IBM Technical Disclosure Bulletin, Cavendish et al., Jul. 1991, "Icon Pane Class", pp. 118–119.

Text of IBM Technical Disclosure Bulletin, Baker et al., Jun. 1991, "Distribution List Class", p. 159.

Text of IBM Technical Disclosure Bulletin, Cavendish et al., Jun. 1991, "Object–Oriented Documentation Tool", pp. 50–51.

Text of IBM Technical Disclosure Bulletin, Allard et al., Feb. 1990, "Object–Oriented Programming in C—the Linnaeus System", pp. 437–439.

Text of IBM Technical Disclosure Bulletin, vol. 38, No. 1, Jan. 1995, pp. 411–414, J. Knapman, "Generating Specific Server Programs in Distributed Object–Oriented Customer Information Control System".

Text of IBM Technical Disclosure Bulletin, vol. 37, No. 12, Dec. 1994, pp. 19–20, Al–Karmi et al., "Events Set for Event Tracing in Distributed Object–Oriented Systems".

Text of IBM Technical Disclosure Bulletin, vol. 37, No. 12, Dec. 1994, pp. 375–378, Acker et al., "Automatically Generating Formatted Documentation for Object–Oriented Class Libraries".

Text of IBM Technical Disclosure Bulletin, vol. 37, No. 11, Nov. 1994, pp. 71–72, Behrs et al., "Device Support Framework to Support ISO DPA 10175 and POSIX 1387.4".

Text of IBM Technical Disclosure Bulletin, vol. 37, No. 7, Jul. 1994, pp. 145–146, Banda et al., "Exception Management Algorithm for Multi–Threaded Method Invocation".

Text of IBM Technical Disclosure Bulletin, vol. 37, No. 6B, Jun. 1994, pp. 553–556, Gest et al., "Portable Object–Oriented Event Manager".

Abstract for WIPO Patent Application No. WO 95/04966, F. T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentation with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract from WIPO Patent Application No. WO 9422081, Sep. 29, 1994, "Hardware–Independent Interface for Interrupt Processing", G.O. Norman et al.

Abstract for WIPO Patent Application No. 94/19752, Anderson et al., Sep. 1, 1994, "Concurrent Framework Processing Apparatus for Two or More Users".

Abstract for WIPO Patent Application No. 94/19751, Anderson et al., Sep. 1, 1994, "Concurrent Framework Processing Apparatus for Application Users".

Abstract for WIPO Patent Application No. 94/19740, Goldsmith et al., Sep. 1, 1994, "Framework Processor of Object–Oriented Application".

Abstract from WIPO Patent Application No. WO 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D. R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract for WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M. A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented".

Inspec Abstract No. C9504–7460–042, Coleman et al., 1995, "An End–to–End Simulation of A Surveillance System Employing Architecture Independence, Variable Fidelity Components and Software Reuse".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, "The Cost of Genericity: Experiments With Constraint–Based Representations of Time–Tables".

Inspec Abstract No. C9501–6140D–005, S. Vinoski, 1994, "Mapping CORBA IDL Into C++".

Inspec Abstract No. C9501–7330–007, Salminen et al., 1994, "Modelling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Oingzhong et al., 1992, "An Object–Oriented Model for Ingelligent Networks".

Inspec Abstract No. C9412–7810–003, from Jung et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented Case Tool".

Inspec Abstract No. C9411–7100–029, from C. Le Pape, 1994, "Implementation of Resource Constraints in ILOG Schedule: A Library for the Development of Constraint–Based Scheduling Systems".

Inspec Abstract No. C9411–6115–035, from Mili et al., 1991, "SoftClass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirklbauer et al,. 1994, "Object–Oriented Process Control Software".

Inspec Abstract No. C9408–6110J–011, from Gyu–Chung et al., 1993, "System Methodologies of Object–Oriented Programs".

Inspec Abstract No. C9407–7420D–045, from Desai et al., "Controller Structure Definition Via Intelligent Process Control".

Inspec Abstract No. C9407–6140D–014, from Satoh et al., 1994, Semantics for a Real–Time Object–Oriented Programming Language.

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Object–Oriented User Interfaces" from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–045, from Rosiene et al., 1995, "A Data Modeling Framework for Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130G–006, "Support for Enterprise Modelling in CSCW", P. Hennessy et al., 1994.

Inspec Abstract No. C9502–7810C–058, from Lin et al., 1995, "Can CAL Software Be More Like Computer Games?".

Inspec Abstract No. C9501–6115–039, from Elia et al., 1993, "G++: An Object Oriented Environment for Developing Distributed Applications".

Inspec Abstract No. C9412–7330–186, from Righter et al., 1994, "An Object–Oriented Characterization of Spatial Ecosystem Information".

Inspec Abstract No. C9412–6160J–025 from J. Livari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environments Using MViews".

Inspec Abstract No. 4664213, "Maintaining Information about Persistent Replicated Objects in a Distributed System", 1993 IEEE Conference on Distributed Computing Systems.

Inspec Abstract No. C9406–6110J–029, "A Comparison of Object–Oriented Analysis and Design Methods", Proceedings of C++ World 1993.

Inspec Abstract No. C9406–0310F–011, 1993, "Cost–Benefit Analysis of Object–Oriented Technology".

Inspec Abstract No. C9406–6110J–007, from J. D. Grimes, 1993, "Objects 101—An Implementation View", Proceedings of COMPCON 1994.

Inspec Abstract No. 4647921, from Uhorchak et al., 1993, "An Object–Oriented Class Library for Creating Engineering Graphs Using PHIGS".

Inspec Abstract No. 4642214, from Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object– Oriented System".

Inspec Abstract No. 4618974, from Bowers, 1993, "Some Principles for the Encapsulation of the Behaviour of Aggregate Objects".

Inspec Abstract No. 461931, from Islan et al, 1993, "Uniform Co–Scheduling Using Object–Oriented Design Techniques".

Inspec Abstract No. 4613481, from Thieme et al., 1993, "Schema Integration in Object–Oriented Databases".

Inspec Abstract No. 4603430, from G. Booch, 1994, "Designing an Application Framework".

Inspec Abstract No. 4596323, from Frank et al., 1993, "An Integrated Environment for Designing Object–Oriented Enterprise Models".

Inspec Abstract No. 4593721, Periyasamy et al., 1993, "A Formal Framework for Design and Verification of Robotic Agents".

Inspec Abstract No. 4588839, from L. Fisher, 1992, "Constructing a Class Library for Microsoft Windows".

Inspec Abstract No. 4588834, from G. Olander, 1992, "Chembench: Redesign of a Large Commercial Application Using Object–Oriented Techniques".

Inspec Abstract No. 4566447, from J. Rossazza, 1992, "An Object–Centered Fuzzy Representation".

Inspec Abstract No. 4565630, from Karpovich et al, 1993, "A Parallel Object–Oriented Framework for Stencil Algorithms".

Inspec Abstract No. C9402–6150G–002, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The Ecology of Class Refinement".

Inspec Abstract No. 4534334, from Campbell et al., 1991, "A Technique for Documenting the Framework of an Object-Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993, "Taxonomic Reasoning with Cycles in Logidata+".

Inspec Abstract No. 4525743, from Hakimzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. B9310–6210L–099, "Templates, Types and Classes in Open Distributed Processing", 1993.

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kraiem et al., 1992, "Mapping of Conceptual Specifications Into Object–Oriented Programs".

Inspec Abstract No. 4417563, from E. Maim, 1992, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec Abstract No. 4400350, from Y. Shoham, 1993, "Agent–Oriented Programming".

Inspec Abstract No. 4395549, from Hogstrom et al., 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Dta and Knowledge to Support Cooperative Query Answering".

Inspec Abstract No. 4366189, from Holt et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems".

Inspec Abstract No. 4302722, from Eggenschwiler et al., 1992, "ET++SwapsManager: Using Object Technology in the Financial Engineering Domain".

Inspec Abstract No. 4298324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from marshall et al., 1991, "Using VDM within an Object–Oriented Framework".

Inspec Abstract No. 4275707, from Tsukamoto et al., 1991, "DOT: A Term Representation Using DOT Algebra for Knowledge–Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++ Strategies".

Inspec Abstract No. 4258051, from Rundensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object-Oriented Framework".

Inspec Abastract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Management".

Inspec Abstract No. C94204–6110J–017, "Choices, Frameworks and Refinement", R. H. Campbell et al., 1991.

Inspec Abstract No. 4090970, from P. Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object–Oriented Hardware Description in CAD Environment".

Inspec Abstract No. 4050569, from Di Giovanni et al., 1990, "HOOD Nets".

Inspec Abstract No. C91072815, from Holtkamp et al, 1990, "DEMOM—A Description Based Media Object Data Model".

Inspec Abstract No. C91072016, from A. Lane, 1991, "/DOS/C++—Application Frameworks".

Inspec Abstract No. C91072574, from Hemery et al., "An Analysis of Communication and Multiprogramming in the Helios Operating System".

Inspec Abstract No. C91064787, from Madany et al, 1989, "A Class Hierarchy for Building Stream–Oriented File Systems".

Inspec Abstract No. C91064580, from Gamma et al., 1989, "Integration of a Programming Environment into ET++—A Case Study".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specification in LOTOS and Z, or My Cat Really is Object–Oriented!".

Inspec Abstract No. C91053475, from Queinnec et al., 1988, "An Open Ended Data Representation Model for EU–LISP".

Inspec Abstract No. C91053151, from E. Cusack, 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Represenatation".

Inspec Abstract No. C90034818, from Q. Chen, 1988, "Extended the Object–Oriented Paradigm for Supporting Complex Objects".

Inspec Abstract No. C90030609, from Forde et al., 1990, "Object–Oriented Finite Element Analysis".

Inspec Abstract No. C9007733, from Weinand et al., 1989, "Design and Implementation of ET++, A Seamless Object–Oriented Application Framework".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al, 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Epxress Parallelism".

Inspec Abstract No. C89014870, from R. King, 1988, "Semantic and Object–Oriented Database Support for Software Environments".

Inspec Abstract No. 89003142, from Tenma et al., 1986, "A System for Generating Language–Oriented Editors".

Inspec Abstract No. C88013915, from Woelk et al., 1987, "Multimedia Information Management in an Object–Oriented Database System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039588, from K. Fukunaga., 1985; "Prompter: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

Taylor, Object–oriented Information Systems Planning and Implementation, Wiley & Sons, Inc., Chapter 6, Apr. 1992.

OBJECT ORIENTED FRAMEWORK MECHANISM FOR ORDER PROCESSING INCLUDING PRE-DEFINED EXTENSIBLE CLASSES FOR DEFINING AN ORDER PROCESSING ENVIRONMENT

REFERENCE TO PARENT APPLICATION

This application is a divisional of U.S. Ser. No. 08/729,206 filed on Oct. 15, 1996 by Branson et al., and entitled "Object Oriented Framework Mechanism for Order Processing Including Pre-Defined Extensible Classes for Defining an Order Processing Environment" (as amended), which is hereby incorporated by reference in its entirety.

FIELD OF THE INVENTION

The present invention relates in general to the data processing field. More specifically, the present invention relates to the field of Object Oriented framework mechanisms.

BACKGROUND OF THE INVENTION

The development of the EDVAC computer system of 1948 is often cited as the beginning of the computer era. Since that time, computer systems have evolved into extremely sophisticated devices, including complex combinations of hardware and software. Computer systems have been applied to a host of different applications. One such application is order processing in a production environment. When different items on a production line must be produced in different configurations, a computer system can be used to assure the items are produced according to the desired specifications.

One example of a production line that typically uses a computer system to track and control order processing is in the manufacturing of computer systems. Modern computer systems are relatively modular. Building a computer system requires assembling various hardware components together and loading various software components into the system, typically by installing the software components on a hard disk drive. A great number of different configurations are possible due to the large number of hardware and software components that may be provided. This results in a relatively complex manufacturing environment that must be able to accommodate the many possible computer configurations.

System configurator software has been developed by some companies to process orders for computer systems. Note that the terms "system configurator" and "order processor" are used interchangeably herein. System configurator software has successfully automated many tasks that were previously done manually during the manufacture of a computer system. However, the specific needs of one computer manufacturer may differ from the needs of a different computer manufacturer, or from the needs of the same manufacturer at a different location or on a different production line. System configurator software is generally developed to provide the exact functionality desired to process orders for the targeted production line. This results in fully custom software that is not easily used for different production lines. A large computer manufacturer may end up with several different system configurators (i.e., order processors) that perform different functions and combinations of functions, with no common interfaces or code, resulting in production systems that must be separately maintained. This means that a change to one system configurator that improves the performance of a production line must be implemented independently for other system configurators, resulting in a great deal of work to make a change effective on several different production lines.

While the discussion above concentrates on system configurators for a computer manufacturer, other system configurators exist for processing orders in a vast number of different environments. For example, many different and diverse manufacturing lines use system configurators to process orders to assure the manufacturing process produces the end item according to the specifications in an order. Each different application typically has its own custom, dedicated system configurator that is not easily adapted to any new or different application. Without a mechanism that can be readily customized and extended to provide a system configurator (i.e., order processor) that has the desired functionality, the time required to program and maintain system configurator software will be excessively long and expensive.

SUMMARY OF THE INVENTION

According to the present invention, an object oriented framework mechanism for an order processing system (i.e., system configurator) provides an infrastructure that embodies the steps necessary to perform order processing and a mechanism to extend the framework to fit a particular order processing environment. Certain core functions are provided by the framework, which interact with extensible functions provided by the framework user. The architecture of the framework allows a developer to determine the conditions and parameters that apply to the order processing while allowing a programmer to interact with the framework with an interface that is consistent regardless of the specific combination of parameters specified in the system configurator. The extensible functions allow new order processing environments to be easily implemented using the framework. The framework thus allows a common programming interface for system configurators implemented using the framework, which may be easily customized to include new or changed parameters. The framework greatly simplifies the programmer's job of developing a system configurator by providing a common programming interface, and by providing established classes that may be easily extended to implement the desired order processing environment.

The framework mechanism of the present invention was designed and constructed using object-oriented technology. Those who are unfamiliar with object-oriented technology, or with object-oriented framework mechanisms, should read the object-oriented overview section of the Description of the Preferred Embodiments.

DESCRIPTION OF THE PREFERRED EMBODIMENTS

Overview—Object-Oriented Technology

Figure 1:
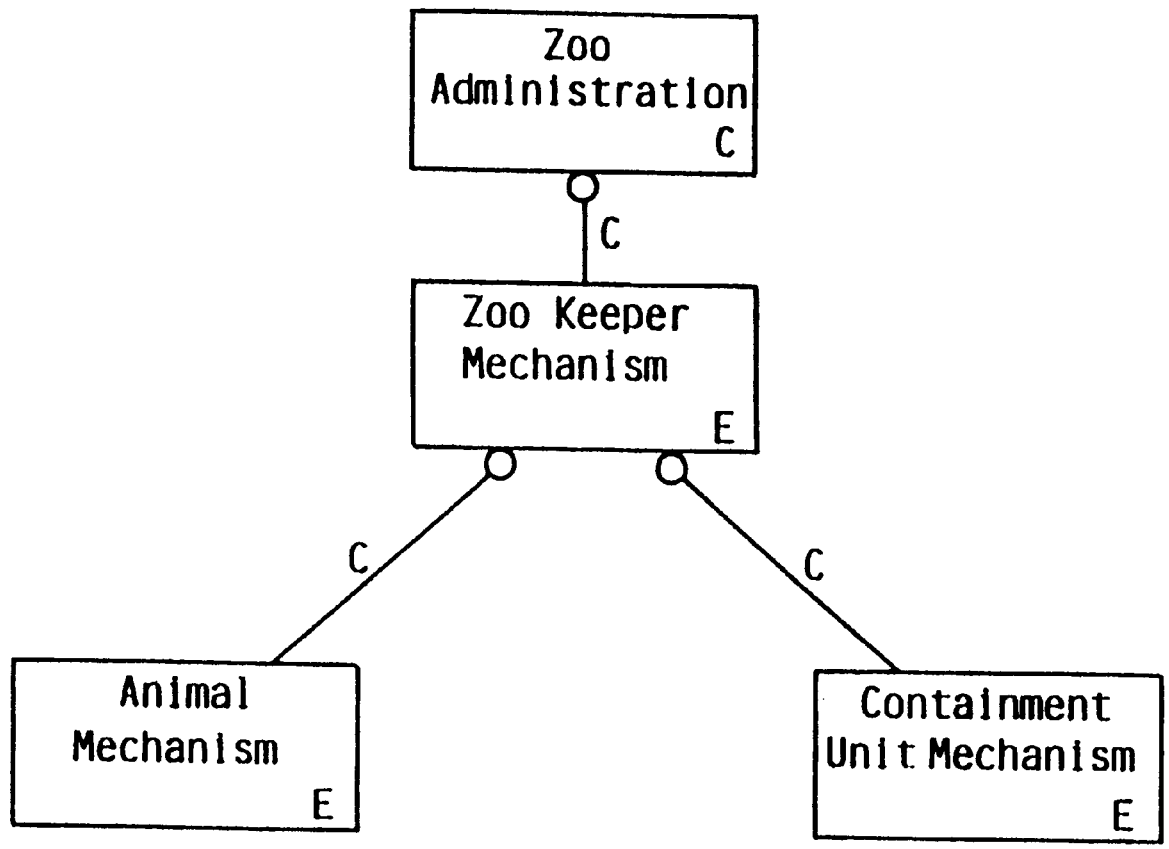
FIG. 1 is a category diagram of an example framework mechanism.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF is Designed

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification (pages 35–40). Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, please refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation of the zoo keeper mechanism. Note also that our framework designer designed the zoo administration mechanism to be a core function of ZAF, which means that it has been designed such that it will not be subject to potential customization and extension. The C in the category box denotes this fact. Please note further that the uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and/or extension by the framework consumer to address future care and feeding requirements. This fact is denoted by the E in the zoo keeper mechanism category box.

Our framework designer has designed the animal mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data (please note that operations are sometimes called methods, method programs, and/or member functions.) When taken together, the defined operation(s) and data are said to be the behavior of the object. In essence, then, a class definition defines the behavior of its member object or objects.

Figure 2A:
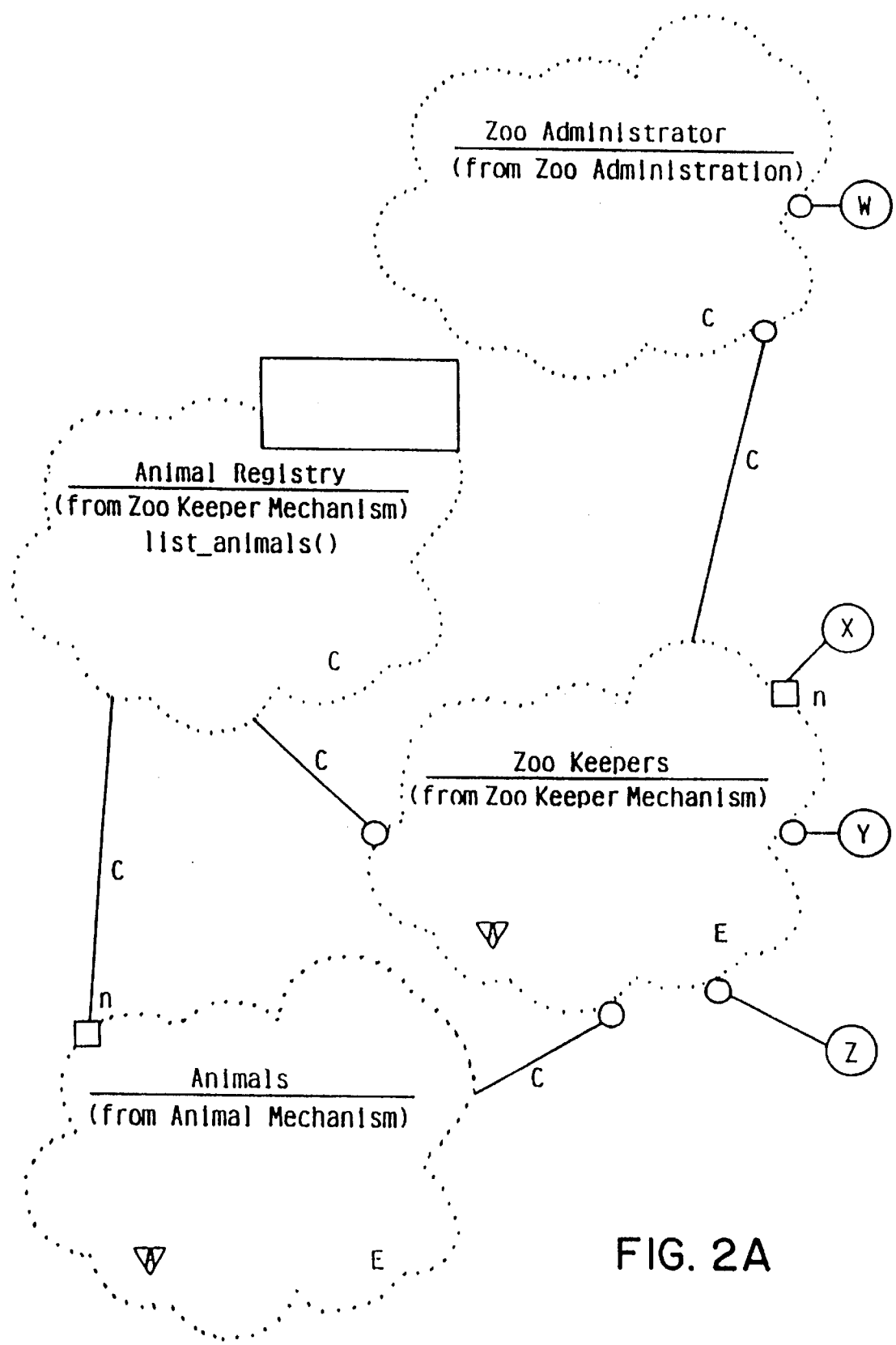
FIGS. 2, 3, 4, 5 and 6 are each a class diagram for the example framework mechanism of FIG. 1.
Figure 2B:
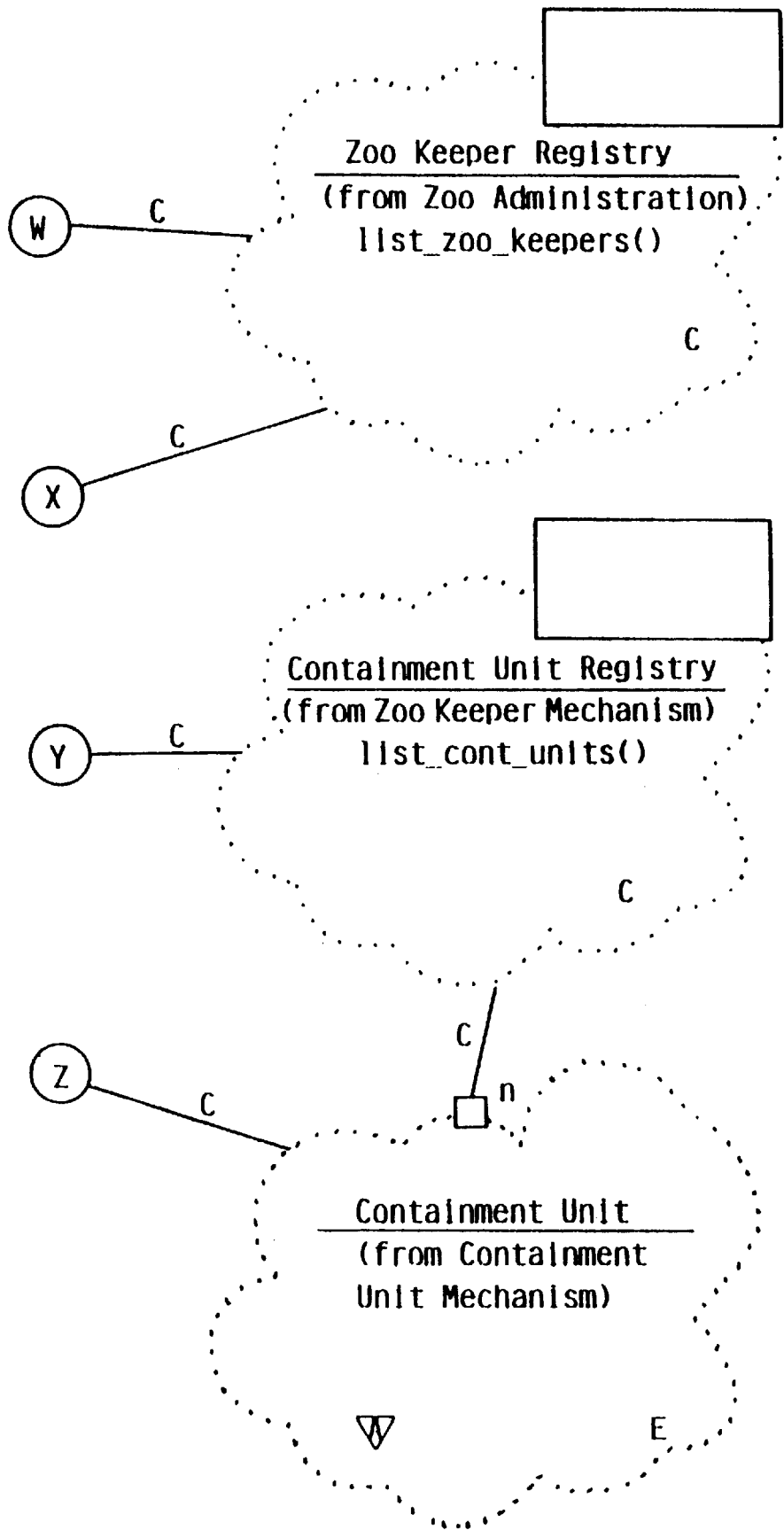

FIG. 2 is an OO class diagram that shows the fundamental classes that our framework designer has designed for ZAF. Each class representation includes its relationship to the mechanisms shown on FIG. 1. For example, we can see that the zoo keepers class is denoted as being from Zoo Keeper Mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

Please note again that the relationships between the classes have been designed as core function of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administrator class has been designed to have a uses relationship with the zoo keeper registry. Our framework designer has designed the zoo administrator and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

Figure 3:
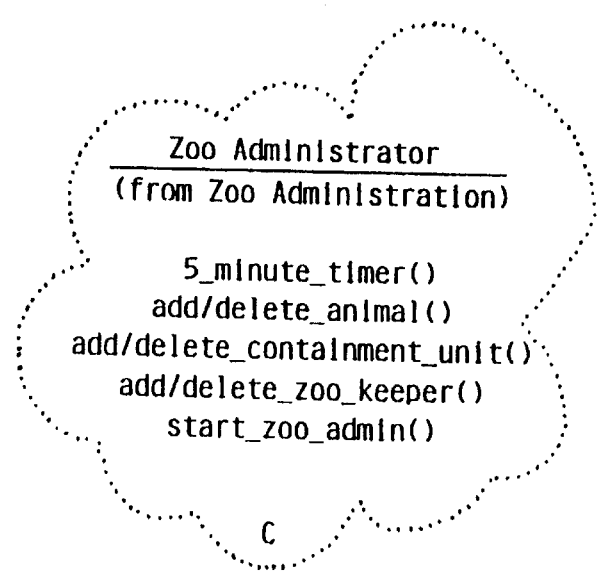

FIG. 3 shows a lower level view of the zoo administrator class. Since objects of type zoo administrator have responsibility for overall control of ZAF, the zoo administrator class has been designed to include operations that perform tasks oriented towards zoo administration. The class definition includes the following five operations: 5_minute_timer( ), add_animal( ), add_containment_unit( ), add_zoo_keeper( ), and start_zoo_admin( ).

The start_zoo_admin( ) operation is responsible for starting ZAF. That is, a user or system administrator will interact with the start_zoo_admin( ) operation to begin administration of a zoo via ZAF. Once started, our framework designer has designed the start_zoo_admin( ) operation to initiate the 5_minute_timer( ) operation. Every five minutes, the 5_minute_timer( ) operation instructs the zoo keeper objects to go out and check on the animals. The add/delete_zoo_keeper operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal( ) operation is responsible for interacting with users to define additional zoo animal classes and objects and to remove classes and objects that are no longer needed. Again, it is quite natural for a zoo to need to add and remove animals. The add/delete_containment_unit( ) operation is responsible for the definition of new containment unit classes and objects and for removal of classes and/or objects that are no longer necessary. Again, our framework designer has designed ZAF in a way that provides this flexibility by designing the animal and containment unit mechanisms as extensible functions.

Referring back to FIG. 2, the zoo keepers class definition has a uses relationship with the animal registry, animals, containment unit registry, and containment units classes. Since the value of ZAF is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

While the classes and categories within ZAF have been described as either core functions or extensible functions, it is important to note that the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (i.e., the overall framework function imposed by the structure and functional requirements of the framework). For example, the animals class has been designed as extensible function of ZAF so that ZAF can be customized to accommodate different types of animals. However, the ability to customize the extensible animals class does not imply that the nature of the customization can violate the basic structure imposed by the core function of ZAF (e.g., by customizing the animal class to the extent that it can no longer be reasonably said to represent a type of animal).

Figure 4:
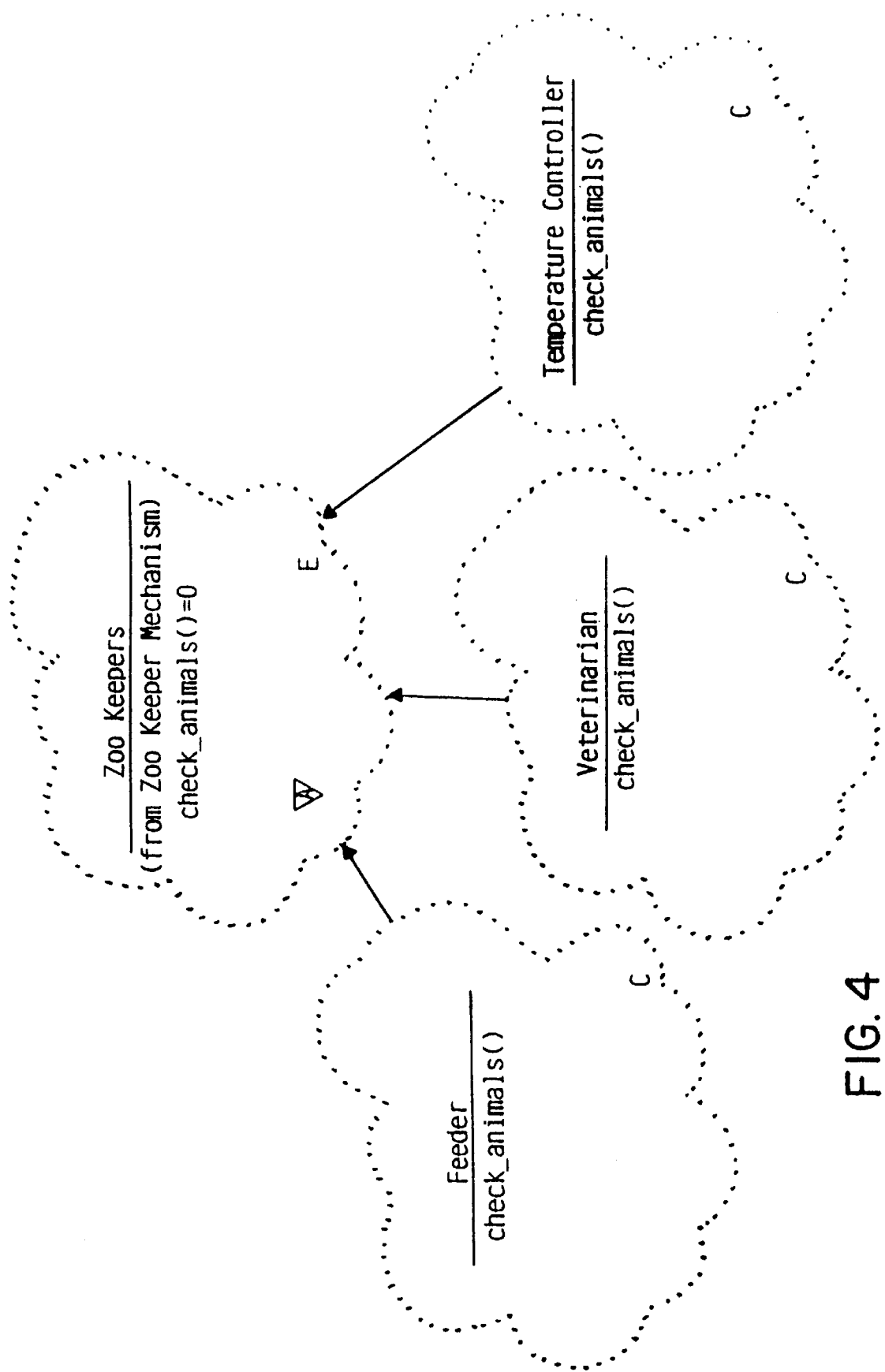

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to specific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (like the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact the action is actually performed. In other words, client objects need only understand that certain objects perform certain functions, not how those functions are actually carried out. This is one way in which a properly designed framework can be readily customized and extended to satisfy future requirements.

Figure 5:
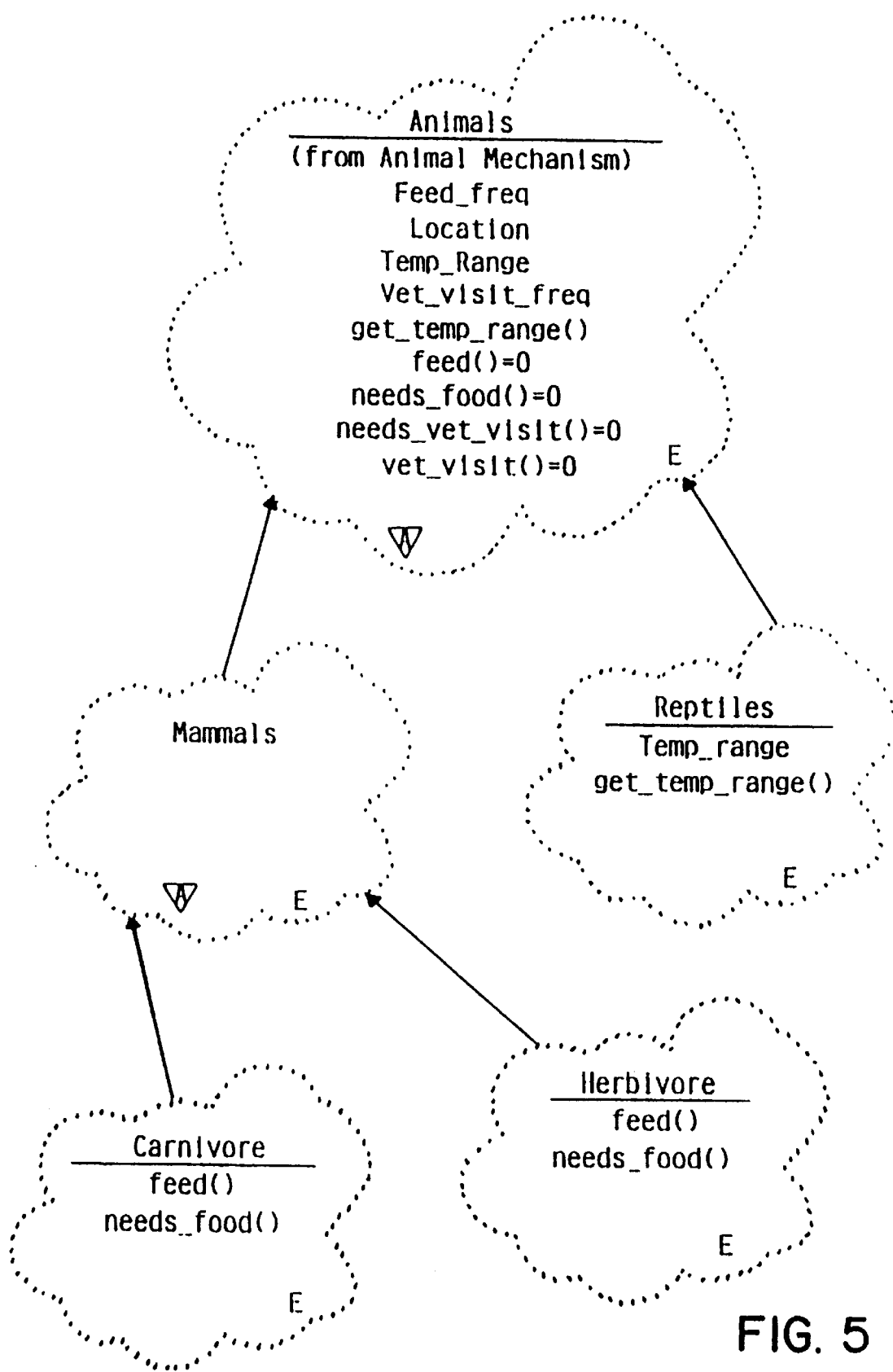

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility.

As shown, the example animal class definition includes data definitions feed_freq, location, and temp_range and operation definitions get_temp_range( ), feed( ), needs_food( ), needs_vet visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply use the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed( ) operation has been left up to the subclasses, subclasses carnivore and herbivore each have their own definition of the feed( ) operation. Again, this is a good design choice because meat eating carnivores are going to have different needs than their plant eating counterparts.

Temp_range is a data definition for the range of temperatures that coincides with that of the specific animal's natural habitat and the get_temp_range( ) operation definition is designed to retrieve the temp_range for a specific animal and return it to a requesting client object. Subclass reptiles contains its own data definition for temp_range and its own definition for the get_temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

Figure 6:
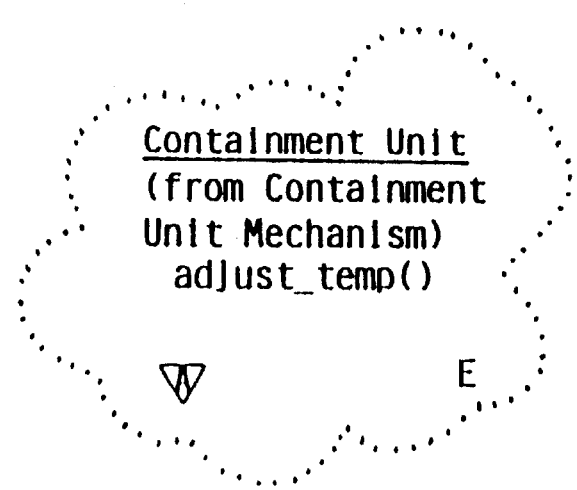

FIG. 6 is a class diagram showing a lower level view of the containment unit class. The containment unit class contains virtual operation definition adjust_temp( ). The adjust_temp definition defines both the interface and mechanism used to actually adjust the temperature in the containment units of the zoo (i.e., via heating and cooling mechanisms which are not shown).

How the ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7A:
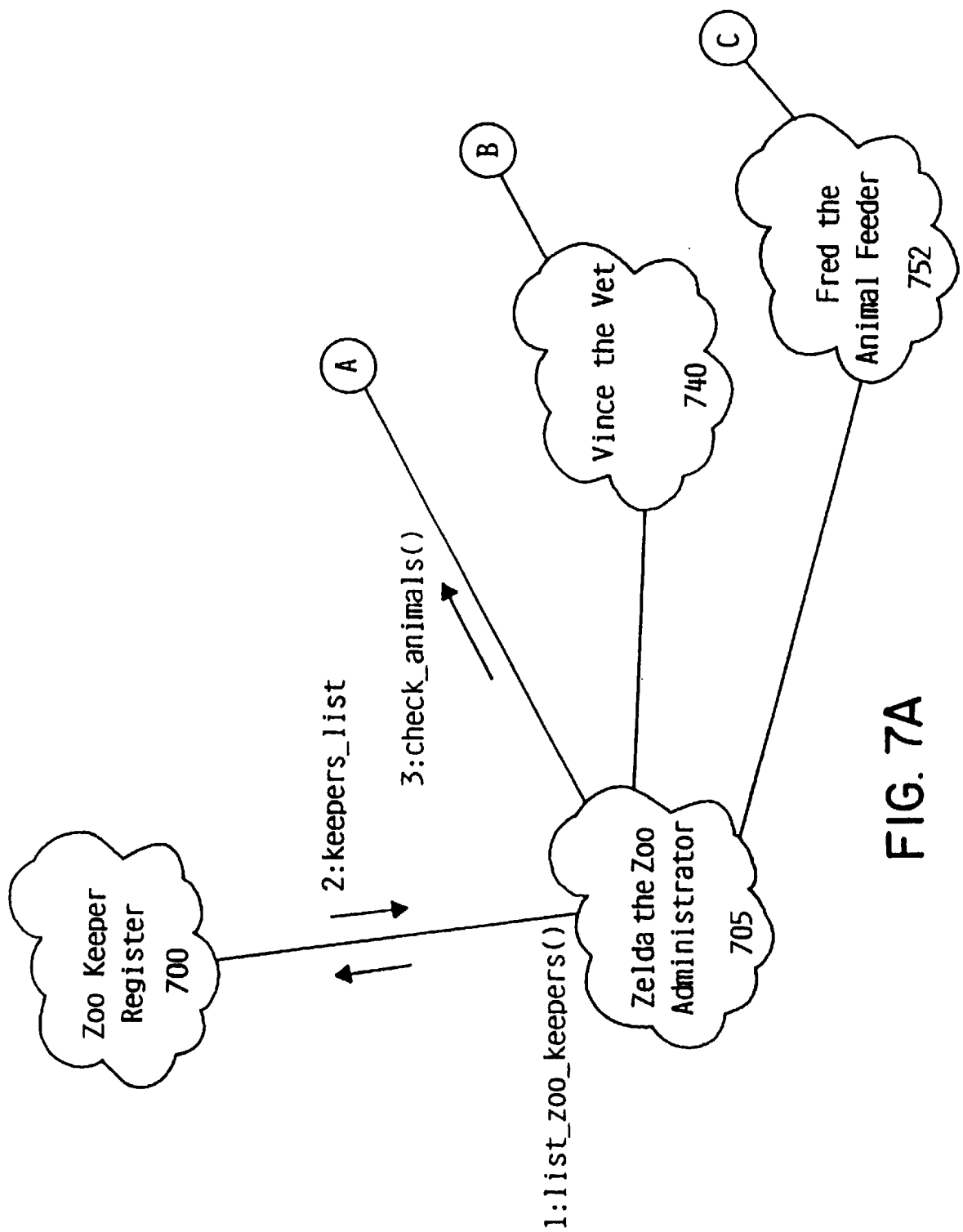
FIG. 7 is an object diagram for the example framework mechanism of FIGS. 1 through 6.
Figure 7B:
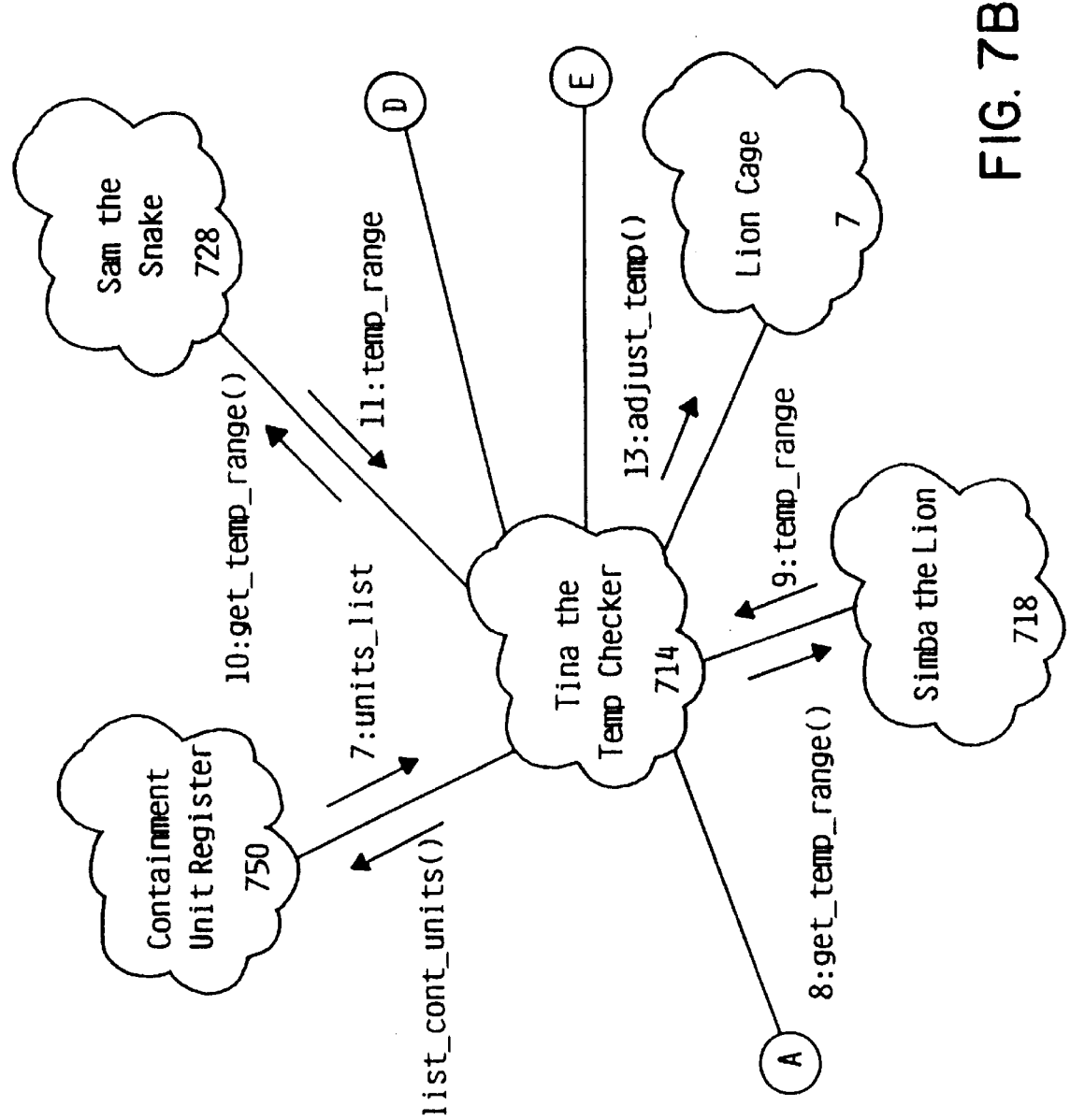
Figure 7C:
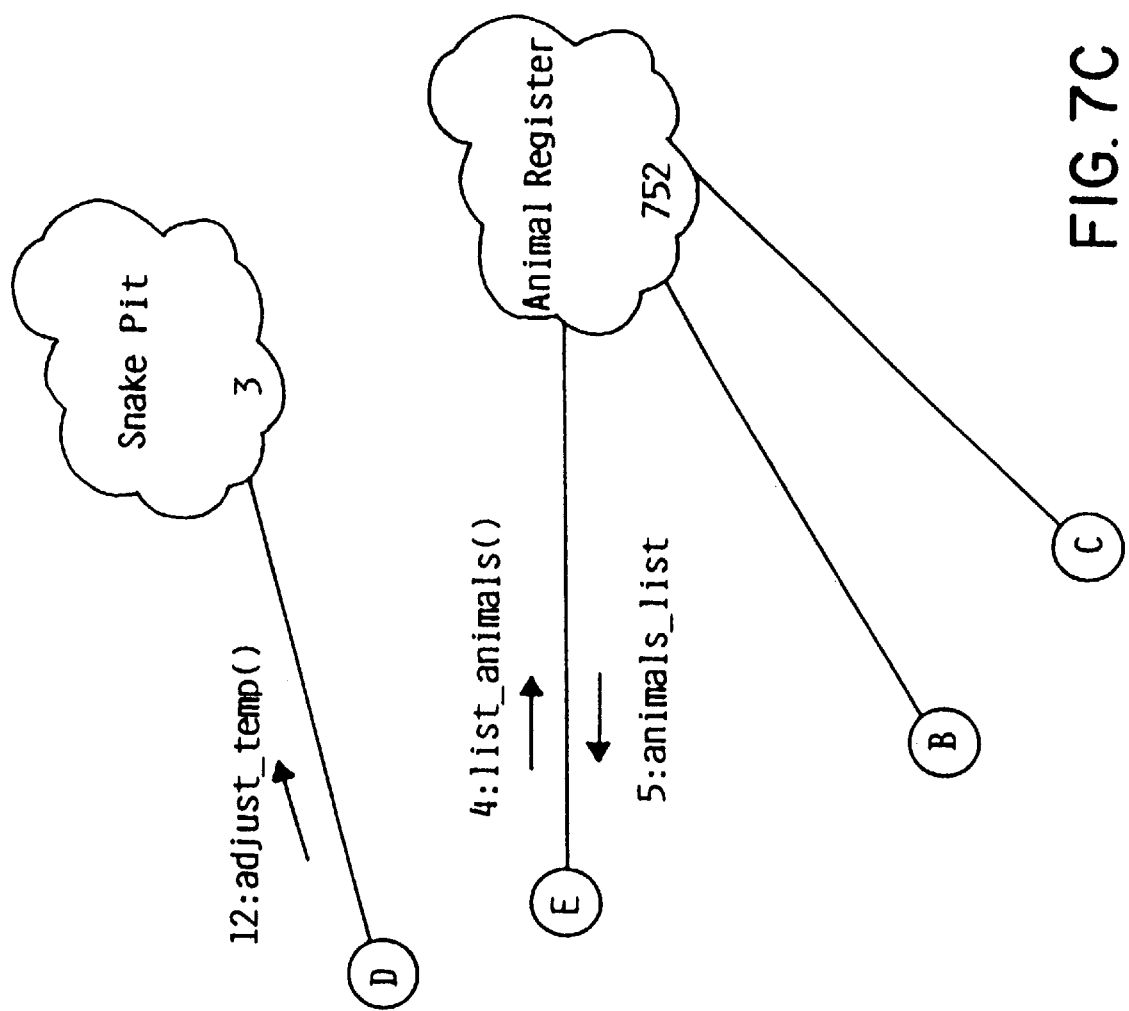

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 706] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check_animals( ) operation of each zoo keeper object [only the call to Tina the Temp. Checker is shown—step 3]. Please note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust temp( ) operations is polymorphic. In other words, the check_animals( ) operation of object Tina does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF mechanism is an extremely simplistic framework mechanism that has been presented here to help novice readers understand some basic framework concepts so as to best appreciate the benefits and advantages of the present invention. These benefits and advantages will become more clear upon reference to the following Detailed Description.

DETAILED DESCRIPTION

Figure 8:
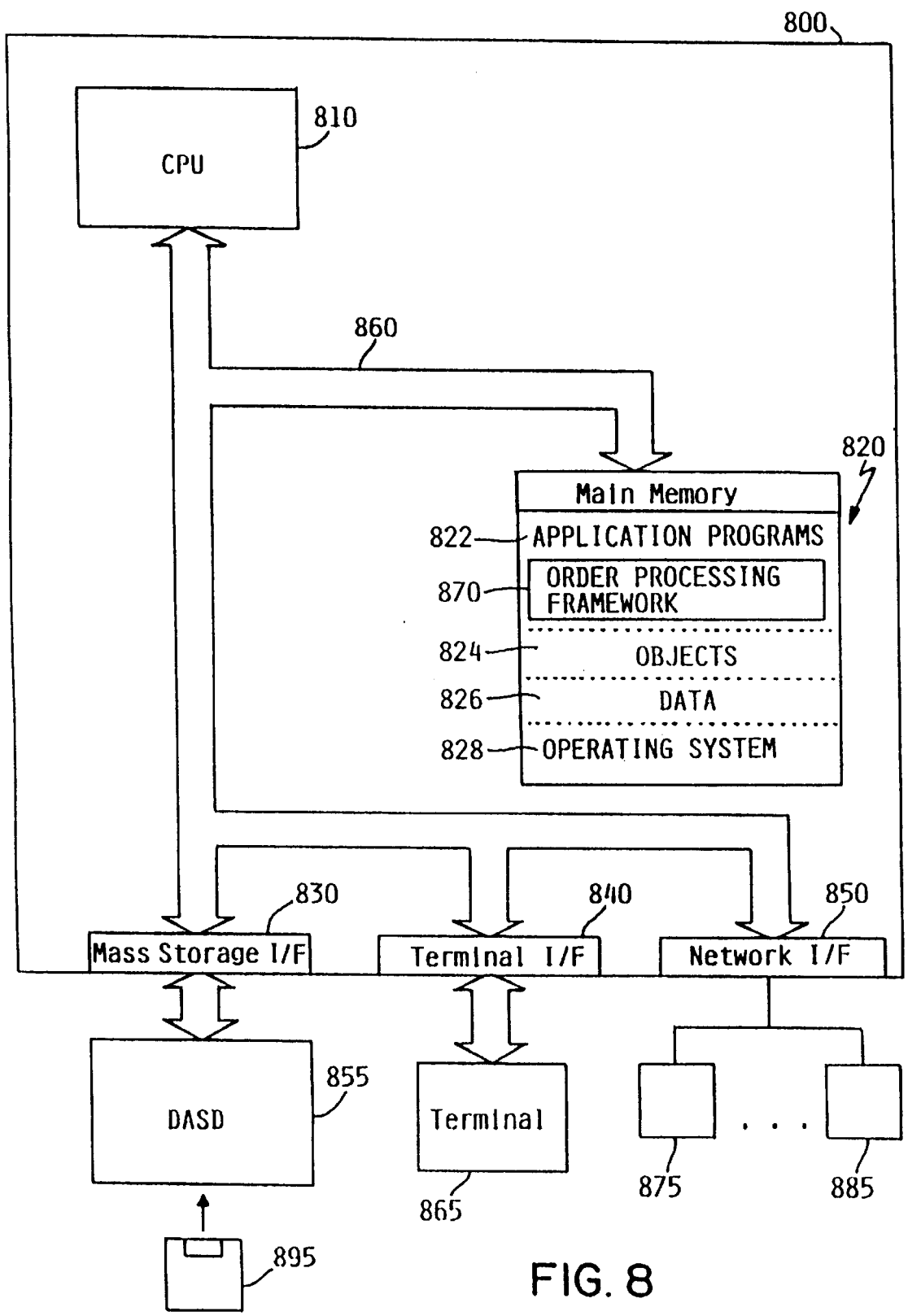
FIG. 8 is a block diagram of the computer system used in the preferred embodiment.

FIG. 8 shows a block diagram of a computer system 800 in accordance with the present invention. The computer system of the preferred embodiment is a computer system such as an AIX platform. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 8, computer system 800 comprises main or central processing unit (CPU) 810 connected to main memory 820, mass storage interface 830, terminal interface 840, and network interface 850. These system components are interconnected through the use of a system bus 860. Mass storage interface 830 is used to connect mass storage devices (such as DASD device 855) to computer system 800. One specific type of DASD device is a floppy disk drive, which may store data to and read data from a floppy diskette 895.

Main memory 820 contains application programs 822, objects 824, data 826, and an operating system 828. Computer system 800 utilizes well known virtual addressing mechanisms that allow the programs of computer system 800 to behave as if they only have access to a large, single storage entity (referred to herein as computer system memory) instead of access to multiple, smaller storage entities such as main memory 820 and DASD device 855. Therefore, while application programs 822, objects 824, and operating system 828 are shown to reside in main memory 820, those skilled in the art will recognize that these programs are not necessarily all completely contained in main memory 820 at the same time. Note that the term "computer system memory" is used herein to generically refer to the entire virtual memory of computer system 800.

Operating system 828 is a suitable multitasking operating system such as AIX; however, those skilled in the art will appreciate that the spirit and scope of the present invention is not limited to any one operating system. Operating system 828 preferably supports an object oriented programming environment such as that provided, for example, by the C++ programming language. One or more application programs 822 provide a programming environment for computer system 800, and include a system configurator framework mechanism 870, which is preferably an object oriented framework mechanism. Framework mechanism 870 contains instructions capable of being executed on CPU 810 and may exist anywhere in the virtual memory space of computer 800.

Although computer system 800 is shown to contain only a single main CPU and a single system bus, those skilled in the art will appreciate that the present invention may be practiced using a computer system that has multiple CPUs and/or multiple buses, whether contained in a single unit or distributed across a distributed processing computer system. In addition, the interfaces that are used in the preferred embodiment each include separate, fully programmed microprocessors that are used to off-load compute-intensive processing from CPU 810. However, those skilled in the art will appreciate that the present invention applies equally to computer systems that simply use I/O adapters to perform similar functions.

Terminal interface 840 is used to directly connect one or more terminals 865 to computer system 800. These terminals 865, which may be non-intelligent or fully programmable workstations, are used to allow system administrators and users to communicate with computer system 800.

Network interface 850 is used to connect other computer systems and/or workstations (e.g., 875 and 885 in FIG. 8) to computer system 800 in networked fashion. The present invention applies equally no matter how computer system 800 may be connected to other computer systems and/or workstations, regardless of whether the connection to the network is made using present-day analog and/or digital techniques or via some networking mechanism of the future. It is also important to point out that the presence of network interface 850 within computer system 800 means that computer system 800 may engage in cooperative processing with one or more other computer systems or workstations. Of course, this in turn means that the programs shown in main memory 820 need not necessarily all reside on computer system 800. For example, one or more application programs 822 may reside on another system and engage in cooperative processing with one or more programs that reside on computer system 800. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the present invention is capable of being distributed as a program product via floppy disk (e.g., 895 of FIG. 8), CD ROM, or other form of recordable media, or via any type of electronic transmission mechanism.

System configurator Framework Mechanism of the Present Invention

The system configurator framework mechanism disclosed herein provides an architecture for processing orders on a computer system. Extending the framework to accommodate order processing in a specific environment defines a "system configurator environment." For example, extending the framework to process orders for IBM's AS/400 production line in Rochester, Minn. creates a system configurator environment that is tailored to the production requirements for the AS/400 line.

By providing framework mechanism 870 within computer system 800 to process orders, a uniform interface for all system configurators may be developed. Framework mechanism 870 may replace all of the proprietary system configurators that are currently used on modem production lines. This would allow a common user interface for virtually any type of production line. This common user interface would greatly ease the burden of programming and maintaining custom system configurators. Thus, one of the primary benefits of the framework disclosed herein is the capability to perform system configuration functions using a simple, easy to use user interface defined by the framework.

Figure 9:
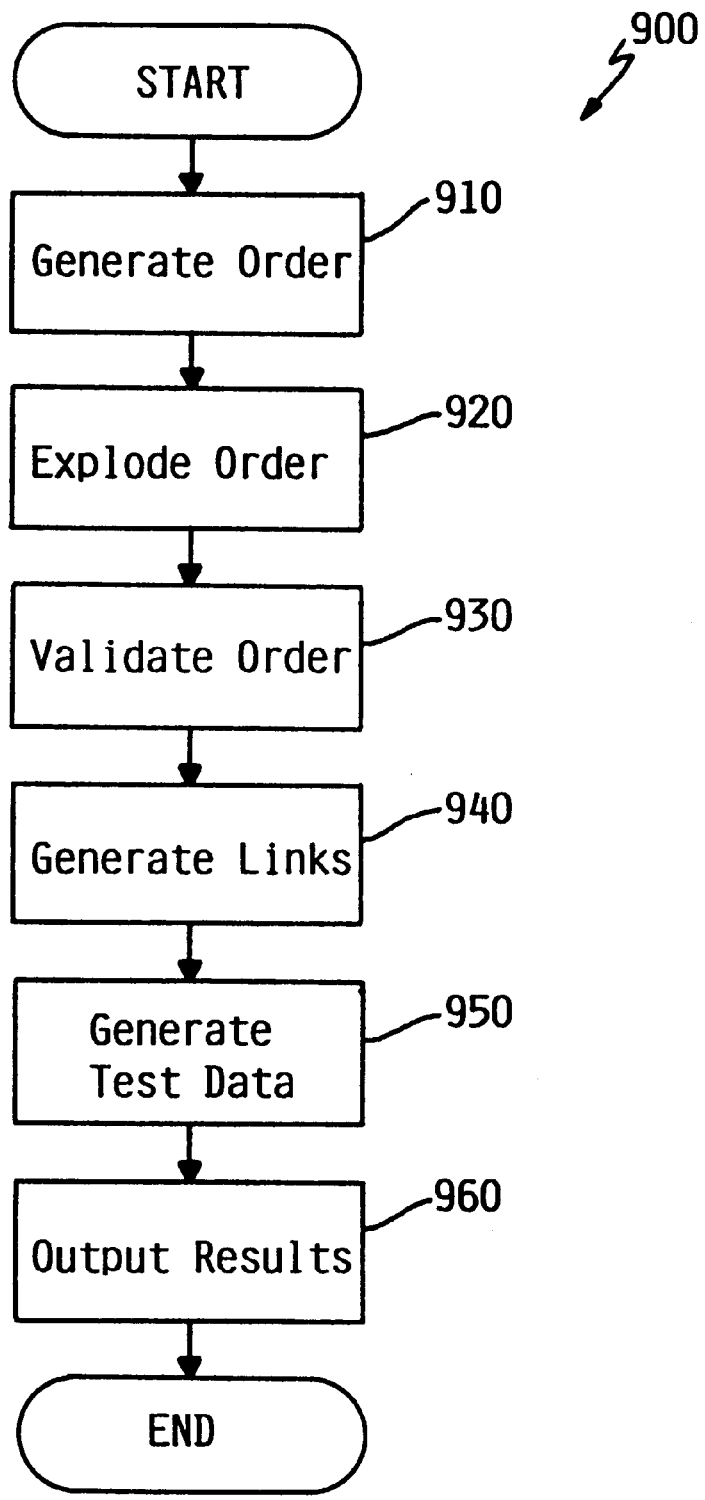
FIG. 9 is a flow diagram showing steps in accordance with the preferred embodiment to perform core functions of the framework mechanism.

Referring to FIG. 9, an example of order processing framework 870 in accordance with the preferred embodiment performs steps that comprise a method 900 for processing orders (i.e., performing system configurator functions) in a production environment. The first step is to generate the order (step 910). This may include substeps such as creating an empty order, and filling the order from information read from an order input file. Once the order is generated, the order is exploded (step 920). Exploding the data involves generating from the original order all parts needed. For example, if a floppy disk drive is specified in the order, exploding the floppy disk drive item may result in listing in the exploded order a floppy disk drive, appropriate mounting hardware, and a cable. The next step is to validate the order (step 930). The validation step uses rules to determine whether the system configuration is valid. For example, if more boards are specified than slots for those boards, validate would return an error to indicate that the order is invalid. Likewise, if the presence of one item mandates the presence of another item (co-requisites) or mandates that other items not be included (mutually exclusive), the validate step will check to make sure the appropriate conditions are met. After validation, links are generated among the different items in the order (step 940). These links can be physical links or logical links. A link is physical if the presence of an item requires a physical relationship to another part. A link is logical if the presence of an item requires that another part be included. For example, a physical link might mandate that a particular card occupy a particular slot in the computer system. A logical link might mandate that certain software drivers are included to drive particular hardware elements. After the links are generated (step 940), test data is generated (step 950). The test data for a particular order is used to specify the test results that are expected if the order is built correctly. Finally, the order is output (step 960) in a form that can be used for subsequent processing (e.g., for shipping or for storage in a database for warranty purposes). While the specific implementation of each step of method 900 will vary according to the desired order processing environment and the specific extensible functions provided by the framework user, method 900 is an illustration of several processing steps that may be performed for a large number of different order processing configurations implemented using a single framework. Note that a particular processing configuration may not use some of the steps in method 900. These steps are defined by the framework, and allow a user of the framework to pick and choose the specific steps and their order needed to accomplish the desired order processing.

The fact that the preferred embodiment of the framework is object oriented allows the user of the framework to easily define the needed functions by subclassing from the classes defined within the framework using known object oriented programming environments, such as C++. The preferred embodiment of the present invention is an object oriented system configurator framework. While many different designs and implementations are possible, one suitable example of an object oriented system configurator framework is disclosed below to illustrate the broad concepts of the present invention.

Class Definitions

Figure 10:
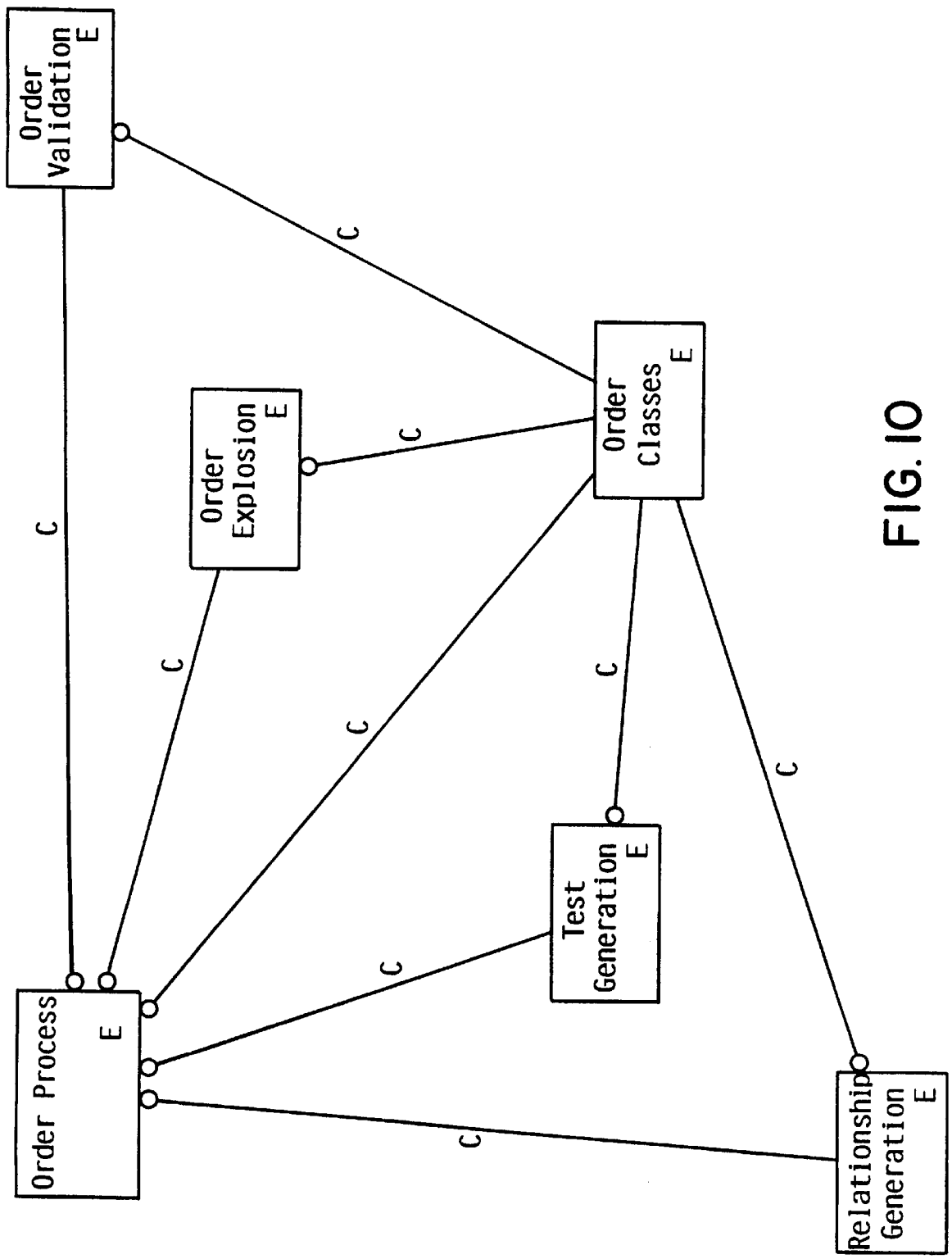
FIG. 10 is a category diagram of a framework mechanism constructed in accordance with the teachings of the preferred embodiment.

FIG. 10 is a category diagram of the order processing framework mechanism 870 in accordance with the preferred embodiment. Those skilled in the art will appreciate that the categories illustrated in FIG. 10 represent collections of object oriented programming (OOP) classes that encapsulate data attributes and behaviors (or methods). Objects instantiated as members of these classes are stored in the main memory 820 of computer system 800. These classes may be implemented, for example, in a computer system operating environment that supports the C++ programming language.

The classes have been broken down into six categories: the Order Process category, the Order Validation category, the Order Explosion category, the Order Classes category, the Test Generation category, and the Relationship Generation category. All of these categories are extensible categories (as indicated by the "E" label), meaning that users may extend the classes in these categories by defining and implementing classes that are subclasses of framework-defined classes. The Order Process category has a using relationship with the other five categories, indicating that classes within the Order Process category invoke the methods provided by the classes in these other categories. In addition, each of the Order Validation, Order Explosion, Test Generation, and Relationship Generation categories all have a using relationship with the Order Classes category. Note that these relationships between categories are core relationships (as indicated by the "C" label), meaning that the framework user cannot modify these relationships.

Figure 11A:
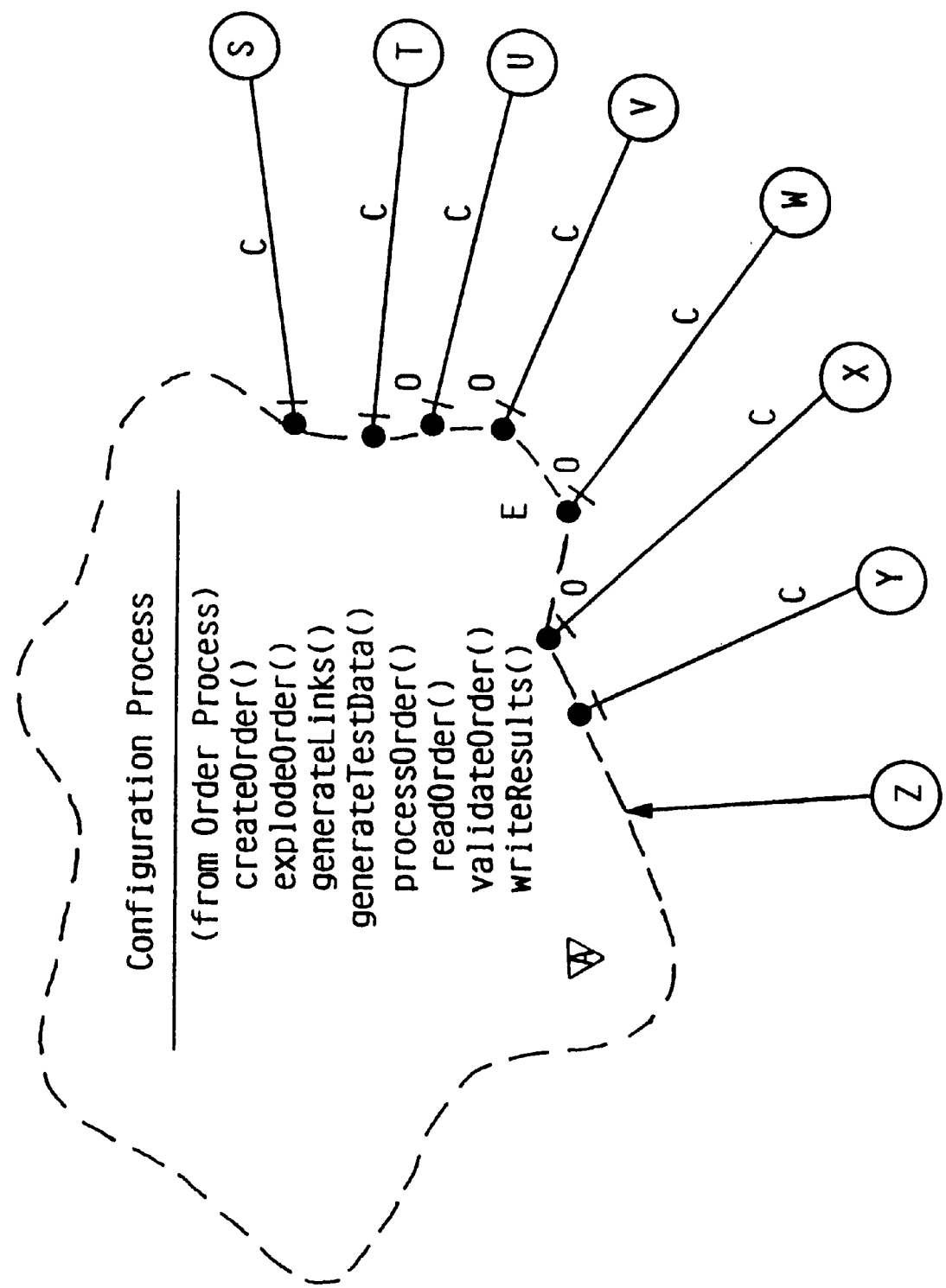
FIGS. 11, 12, 13, 14, 15 and 16 are each a class diagram of a framework mechanism constructed in accordance with the teachings of the preferred embodiment.
Figure 11B:
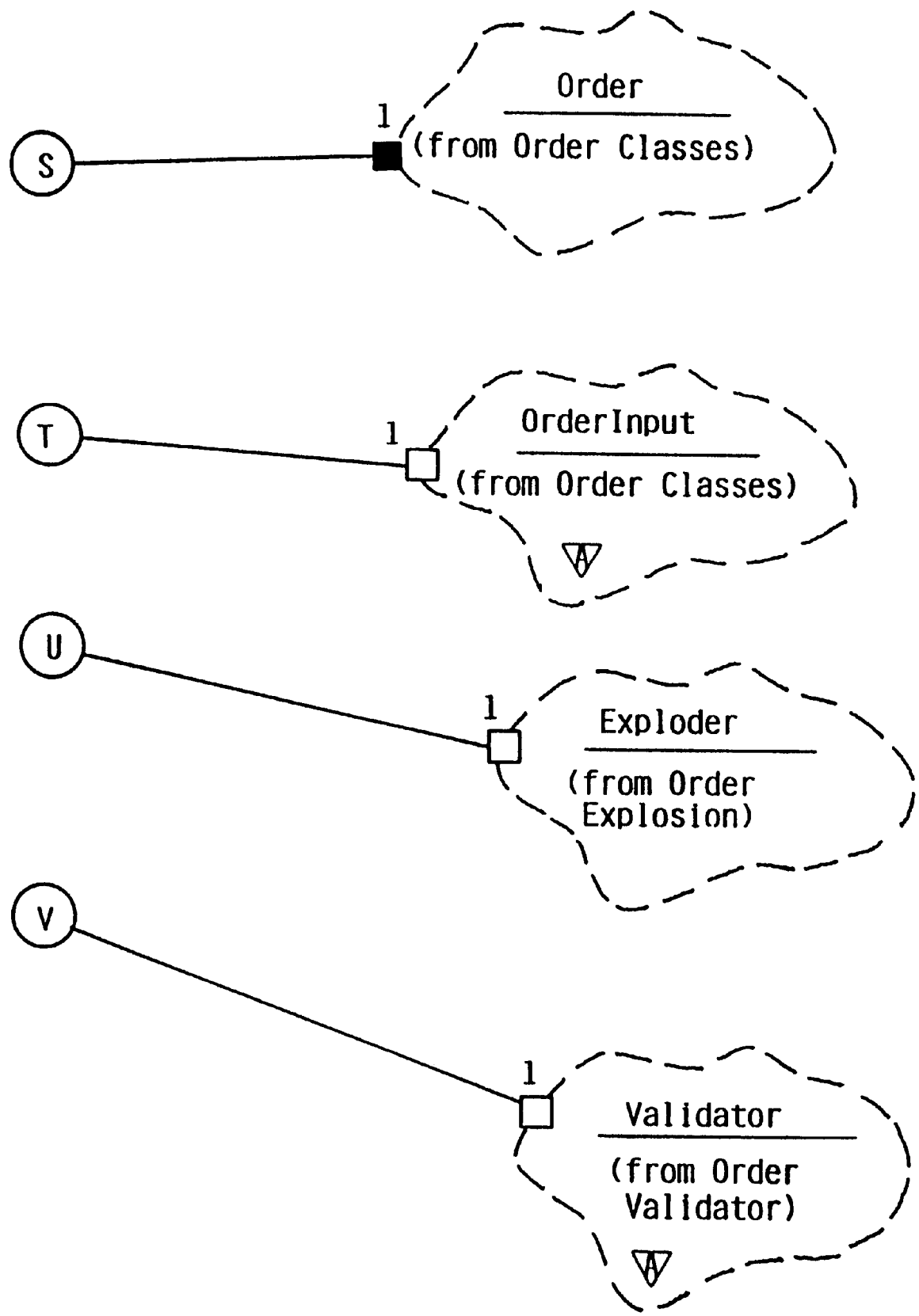
Figure 11C:
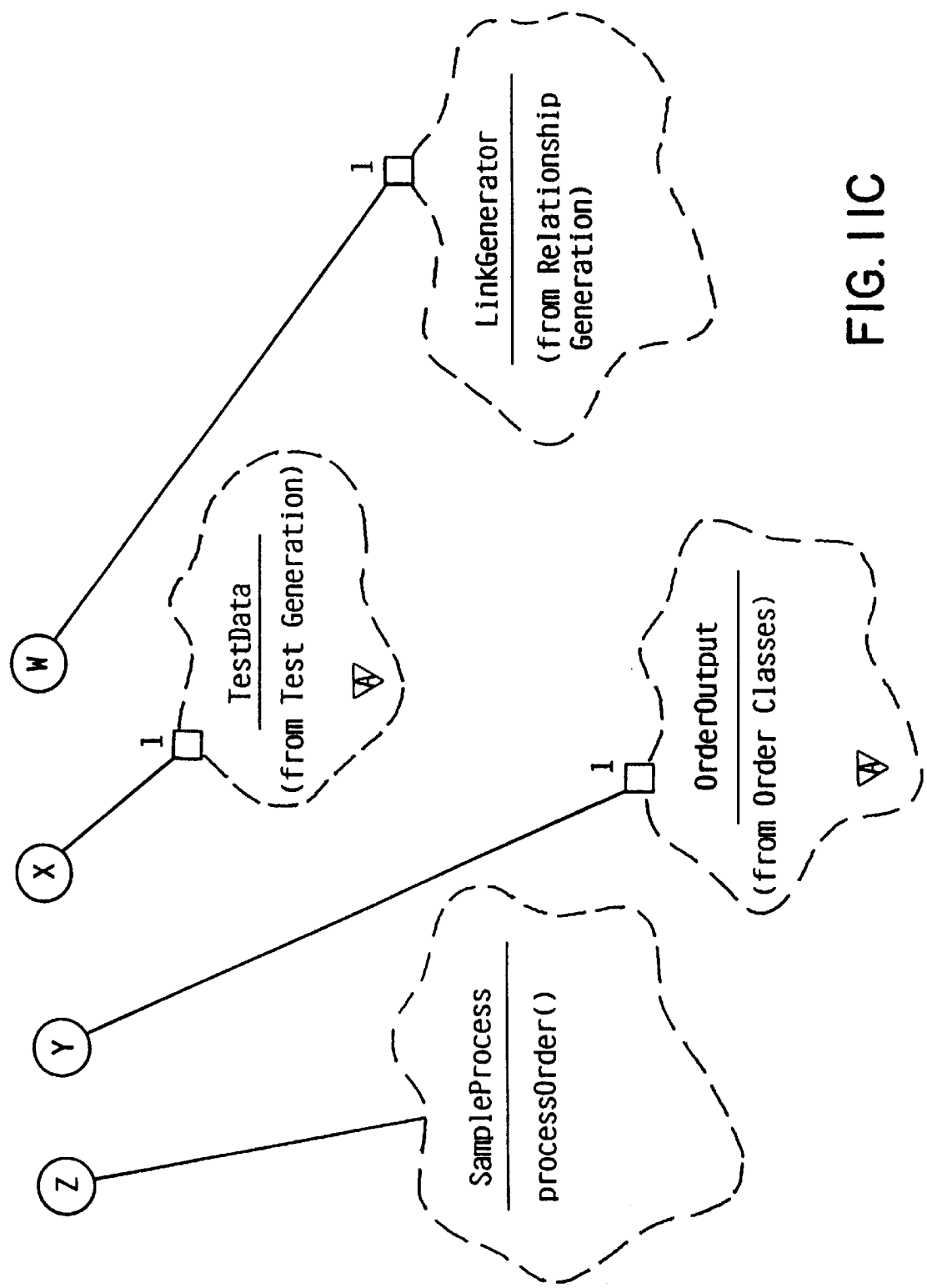

FIG. 11 is a top level class diagram of the classes used to implement system configurator framework 870. The Configuration Process class belongs to the Order Process category. The Order class, the OrderItem class, the OrderInput class, and the OrderOutput class are all classes in the Order Classes category. The Exploder class is a member of the Order Explosion category; the Validator class is a member of the Order Validation category; the TestData class is a member of the Test Generation category; and the LinkGenerator class is a member of the Relationship Generation category. The key methods provided in each class are not shown in FIG. 11, but are shown in subsequent figures. The SampleProcess class in FIG. 11 is one example of a possible order processing environment that a user could define by appropriate subclassing of the Configuration Process class. Each different subclass of the Configuration Process class provides a different order processing environment that defines how a specific production line processes orders. Many different subclasses could be defined to support a large number of order processing environments.

FIG. 11 illustrates the relationships of the Configuration Process class to other classes in the framework. Configuration Process is an extensible class that contains the methods shown. Configuration Process is a class that a user of the framework will extend to define a specific order processing environment that needs to be supported by the framework by subclassing the appropriate abstract classes (such as OrderInput, Validator, etc.). Configuration Process has a "has by value" relationship to the Order class, indicating that a system configurator environment will include an object from the Order class. Configuration Process also has a "has by reference" relationship to the OrderInput class, the Exploder class, the Validator class, the LinkGenerator class, the TestData class, and the OrderOutput class, indicating that a suitable order processing environment implemented by appropriate subclassing of the framework may define zero or one of each of these classes. From a practical standpoint, this means that each of these classes is optional, depending on the demands of the specific order processing environment. If an order processing configuration needs to perform order validation, the user of the framework will subclass from the Validator class. If no validation is needed, the user will not subclass from the Validator class, and the result is that there will be no validation performed. All of the relationships between classes in FIG. 11 are core relationships, which a user of the framework may not alter.

An object instantiated under the Configuration Process class may have any of the methods shown in FIG. 11. This class uses object composition to bring together all the necessary and optional mechanisms of the order processing environment. The processOrder( ) method is the method that is invoked by the main program to start the order processing defined by the framework mechanism. The processOrder( ) method defines which methods are required by the framework, and further defines the order of their execution. The remainder of the methods in the Configuration Process class are dummy methods that delegate their functions to methods of the other classes. In this manner a user of the framework may implement any order processing environment with the framework mechanism of the preferred embodiment by appropriately subclassing of the pertinent classes and by defining the processOrder( ) method to invoke the methods on the classes that are needed to implement the order processing environment.

Figure 12:
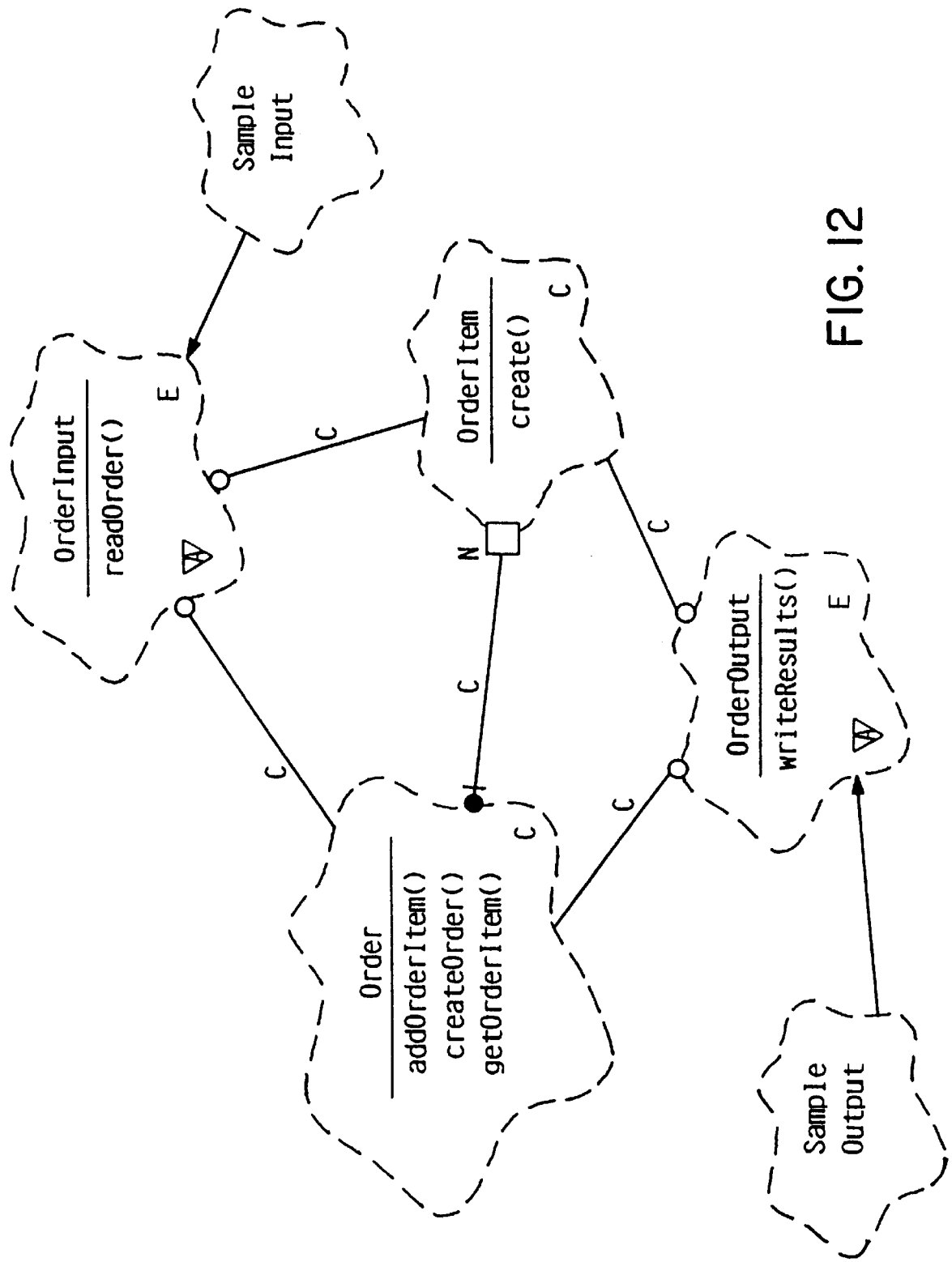

A class diagram of the classes in the Order Classes category are shown in FIG. 12. The Order class is a core class, and has a "has by reference" relationship with the OrderItem class, which is a core class, with the N indicating that each order will have multiple OrderItems. The Order class contains a tree structure of order items. The tree structure defines the structure of a customer's order. Nodes in the tree represent order items and branches represent relationships between order items. These relationships determine how a given order item was ordered. The OrderInput class has a "using" relationship with the Order class and the OrderItem class, indicating that the OrderInput class may call the methods on these other two classes. In similar fashion, the OutputOrder class has a "using" relationship with the Order class and the OrderItem class. Note that the relationships between these classes are core relationships, those that may not be changed by the user of the framework.

As described with reference to FIG. 11, a user of the framework may extend the framework by subclassing from the extensible classes. Thus, for the OrderInput class in FIG. 12, the Sample Input class is shown as one example of a suitable subclass from the OrderInput class. In similar fashion, Sample Output is a suitable subclass from the OrderOutput class in FIG. 12. These user-defined subclasses may be defined and used in one or more order processing environments.

The extensible OrderInput and OrderOutput classes in FIG. 12 define a set of methods which provide the core functions needed for the framework to operate. Each of these methods correspond to functions that may be performed during order processing. These methods provide extensible interfaces that allow a user of the framework to take advantage of the flexibility and power of the framework by easily adapting the framework to new or different order processing environments. The specific implementation shown in the figures for the classes are shown for the purpose of illustration, and a framework user may select alternative implementations by overriding extensible methods in the classes.

The Order class has three methods: addOrderItem( ), createOrder( ), and getOrderItem( ). The addOrderItem( ) method is used to add an order item to an order. An item is added to an order by invoking the create( ) method on the OrderItem class. The createOrder( ) method is used to reset an order object to handle a new order. The getOrderItem( ) method is used by multiple objects in the framework to access the order items that have previously been read into the order. When the order processing is complete, the writeResults( ) method of the OrderOutput class is invoked, which transfers the results of processing a particular order to a specified location for storage or further processing.

Figure 13:
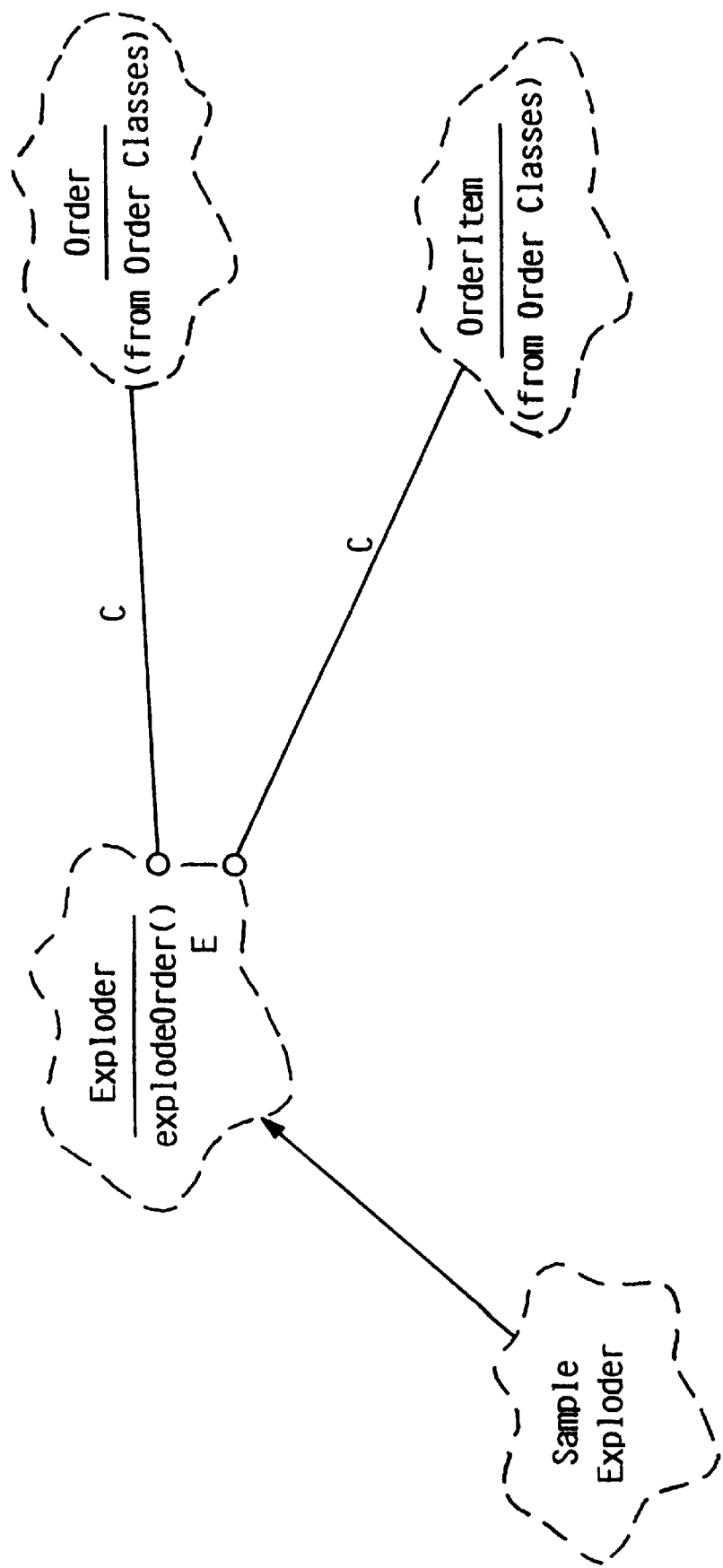

Referring to FIG. 13, the Exploder class is an extensible class of the framework. The Exploder class has a "using" relationship with the Order and OrderItem classes. The Exploder class has a single method explodeOrder( ), which is used to explode an order into its fundamental parts, which are referred to herein as placeable entities. ExplodeOrder( ) is used to "explode" any part numbers that are order items that may require additional parts. For example, as discussed above, if a floppy disk drive is specified, the explodeOrder( ) method may add additional order items corresponding to mounting hardware and a cable that are necessary if a floppy disk drive is to be installed into the computer system. As illustrated by the Sample Exploder subclass of FIG. 13, many numerous possible subclasses for Exploder may be implemented, and any user-defined subclasses of the Exploder class are within the scope of the present invention.

Figure 14:
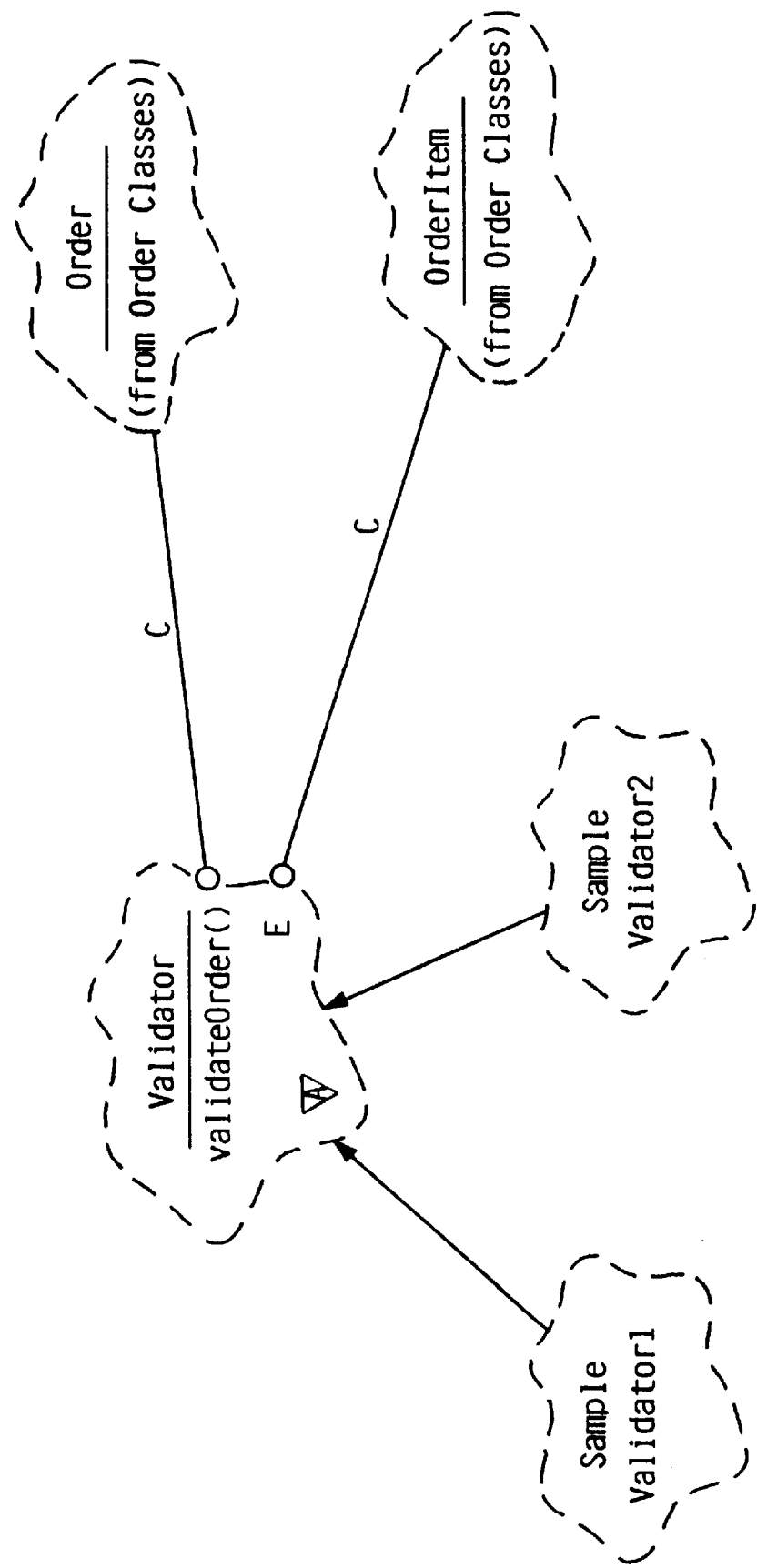

Referring to FIG. 14, the Validator class is an extensible abstract class of the framework. The Validator class has a "using" relationship with the Order and OrderItem classes. The Validator class has a single method validateOrder( ), which is used to assure that there are no conflicting or missing order items within an order. For example, if a floppy disk drive is specified in a particular drive bay, and a CD-ROM drive is specified for the same drive bay, validateOrder( ) will detect the erroneous condition, and will not proceed with the order processing until the error has been corrected so the order may be properly validated. As illustrated by the Sample Validator1 and Sample Validator2 subclasses of FIG. 14, many numerous possible subclasses for Validator may be implemented.

Figure 15:
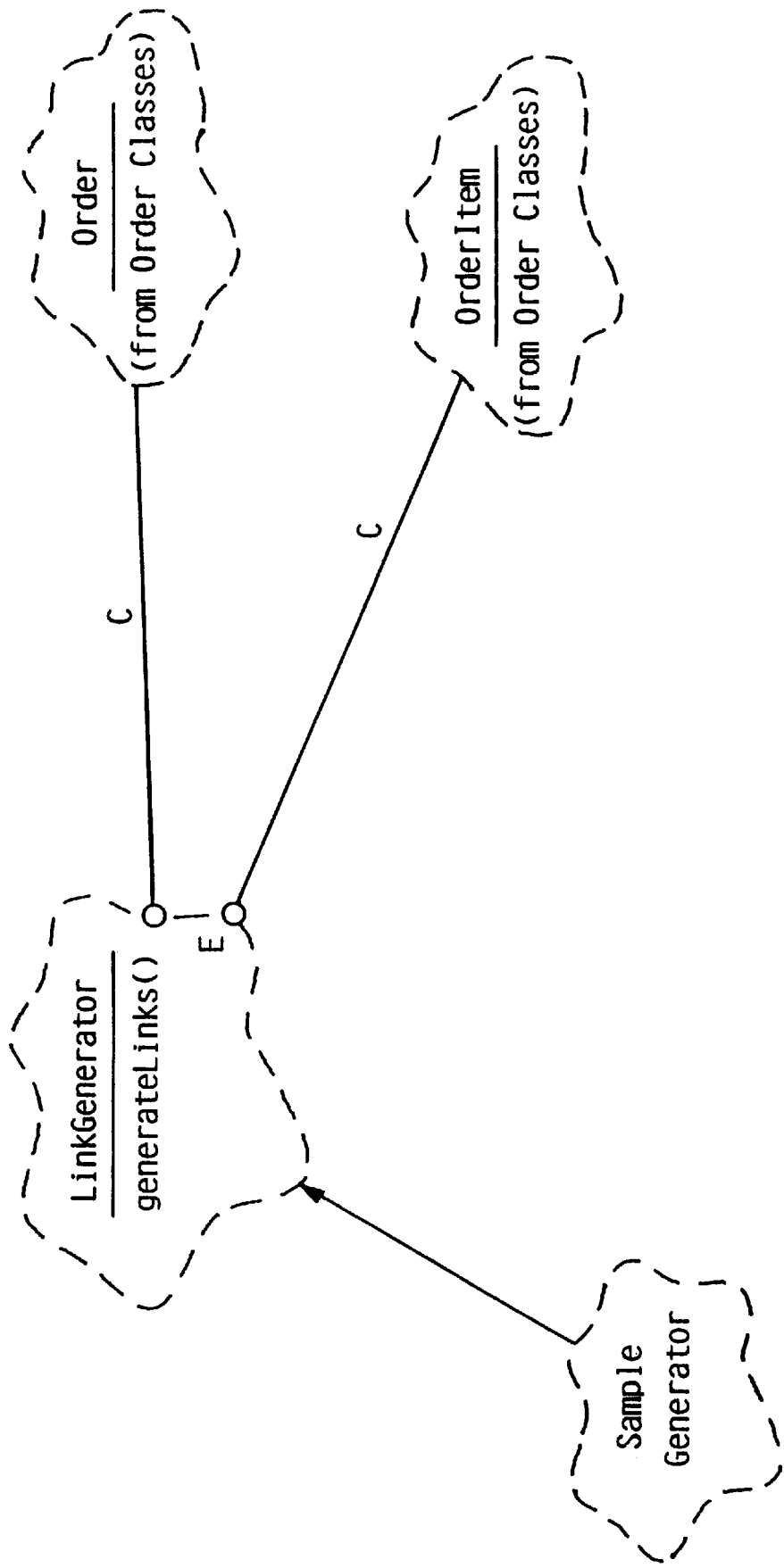

Referring to FIG. 15, the LinkGenerator class is an extensible class of the framework. The LinkGenerator class has a "using" relationship with the Order and OrderItem classes. The LinkGenerator class has a single method generateLinks( ), which is used to provide physical or logical links between order items. For example, if a particular card must occupy a particular slot, a link will establish this physical relationship. In similar fashion, if the explodeOrder( ) method in the Exploder class has detected that a CD-ROM drive is specified that requires a specific software driver to be loaded, and adds the software driver as an order item, the generateLinks( ) method will establish a logical link between the two order items. As illustrated by the Sample Generator subclass of FIG. 15, many numerous possible subclasses for LinkGenerator may be implemented.

Figure 16:
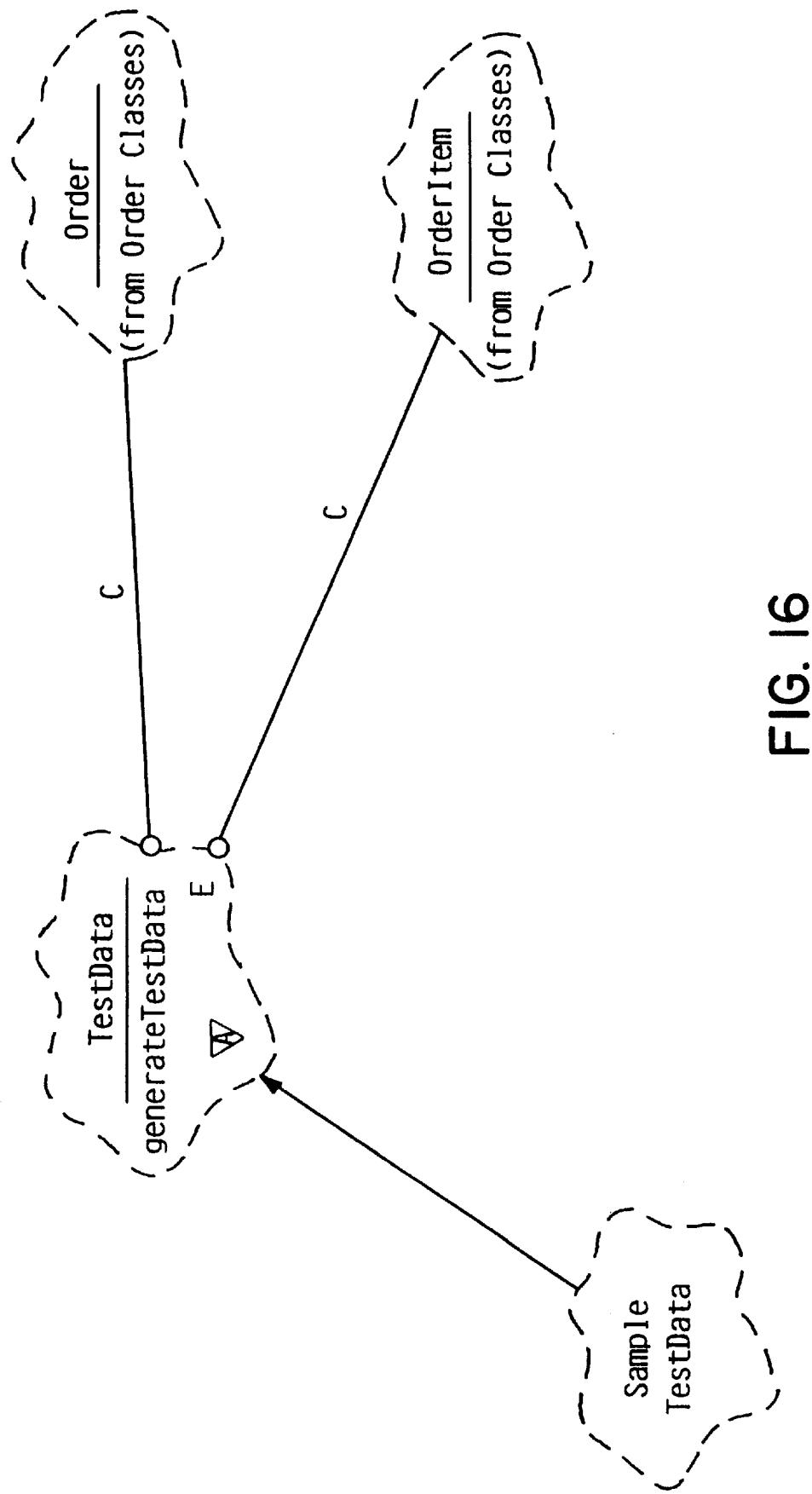

Referring to FIG. 16, the TestData class is an extensible abstract class of the framework. The TestData class has a "using" relationship with the Order and OrderItem classes. The TestData class has a single method generateTestData( ), which generates the proper test data that should result if the computer system is built and configured according to the order. This data is compared with the actual test data obtained from testing the unit, and if the data matches, the unit is properly built and configured as specified in the order. As illustrated by the Sample TestData subclass of FIG. 16, many numerous possible subclasses for TestData may be implemented.

Core Functions

FIG. 11 best distinguishes between core and extensible functions in the system configurator framework of the present invention. Specifically, as noted above, many of the classes in this framework are extensible classes. All class relationships shown in FIG. 11 are core relationships, and may not be modified by the user of the framework. In fact, it is the fixed character of these relationships between classes that characterizes a framework and makes it useful and powerful. The core function of the order processing framework is defined by the core classes, the core class relationships, and the functional requirements that cause the framework to behave in the desired manner. As described above with respect to FIG. 9, the overall core function of the order processing framework includes the steps of method 900. Note, however, that not all of the steps of method 900 need be implemented in a particular order processing environment For example, if order validation and the generation of test data are not needed in a given order processing environment, these steps (930 and 950) may be omitted. The various functions of FIG. 9 are core functions not because they are always performed, but because the framework provides support for the implementation of each of these steps. The specific steps that make up any order processing environment depend on how the user of the framework extends the classes and defines (or overrides) the appropriate methods.

Object Interaction

Figure 17A:
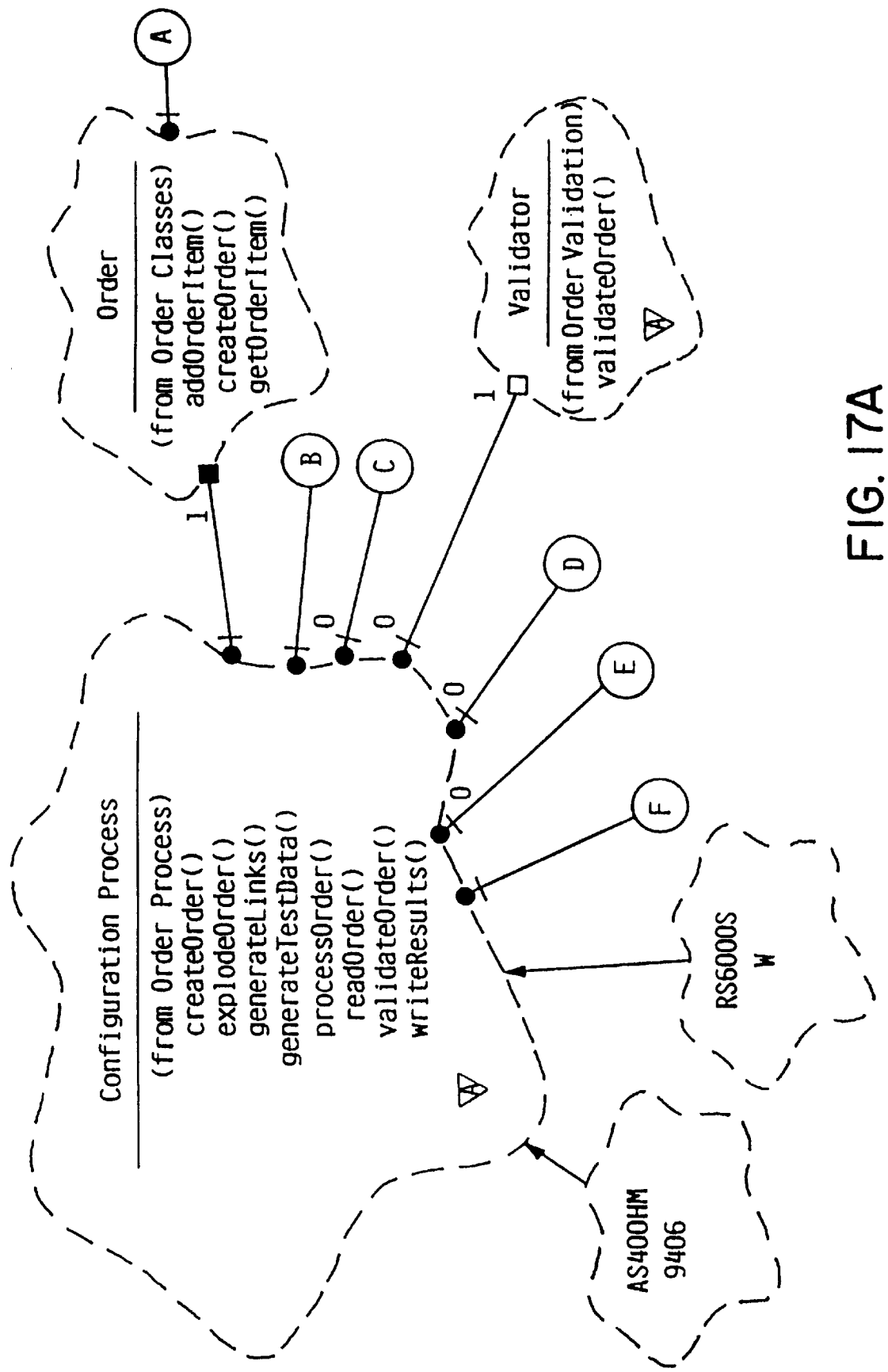
FIG. 17 is a class diagram showing the extension of the framework to implement two specific system configuration environments.
Figure 17B:
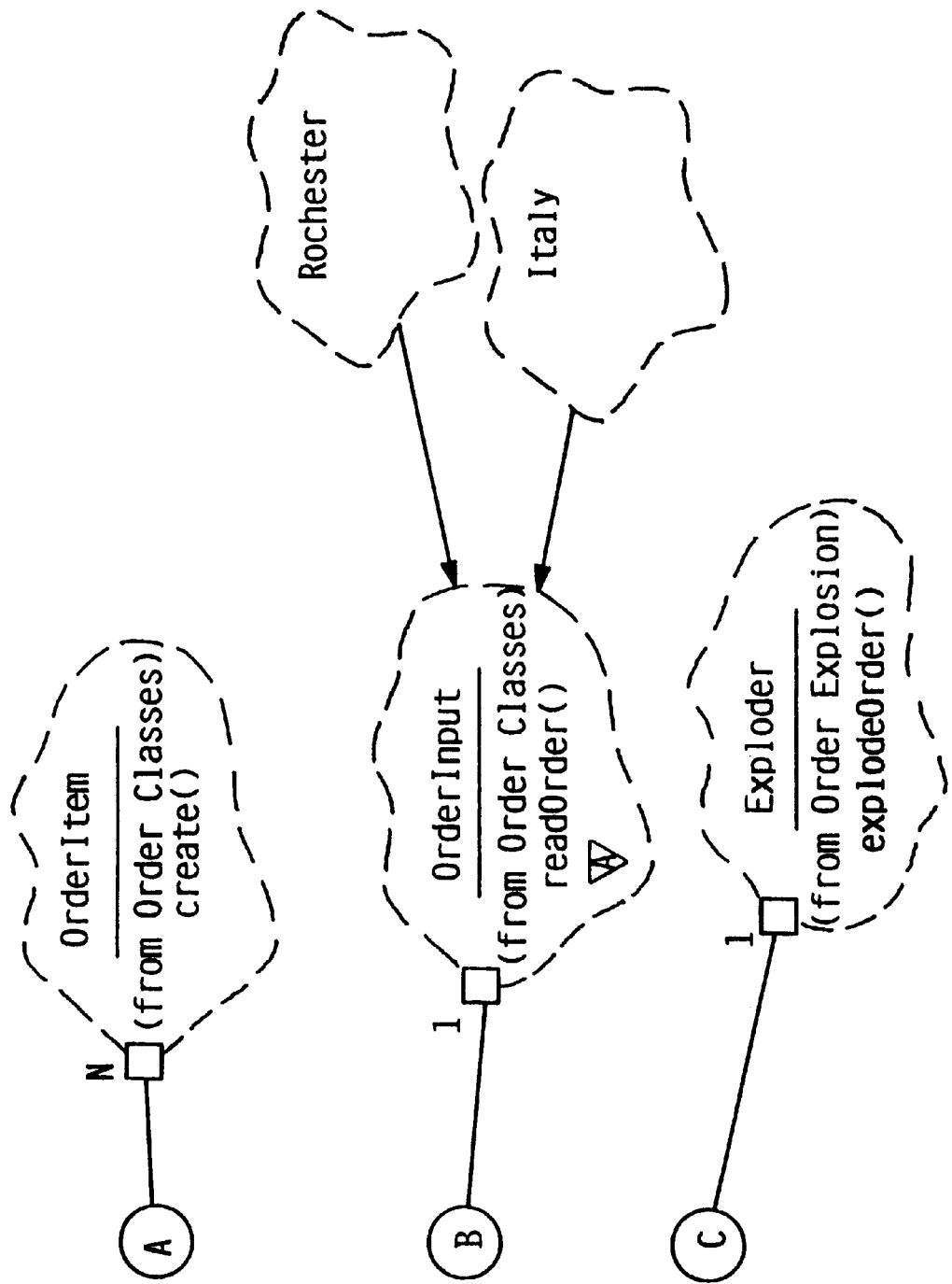
Figure 17C:
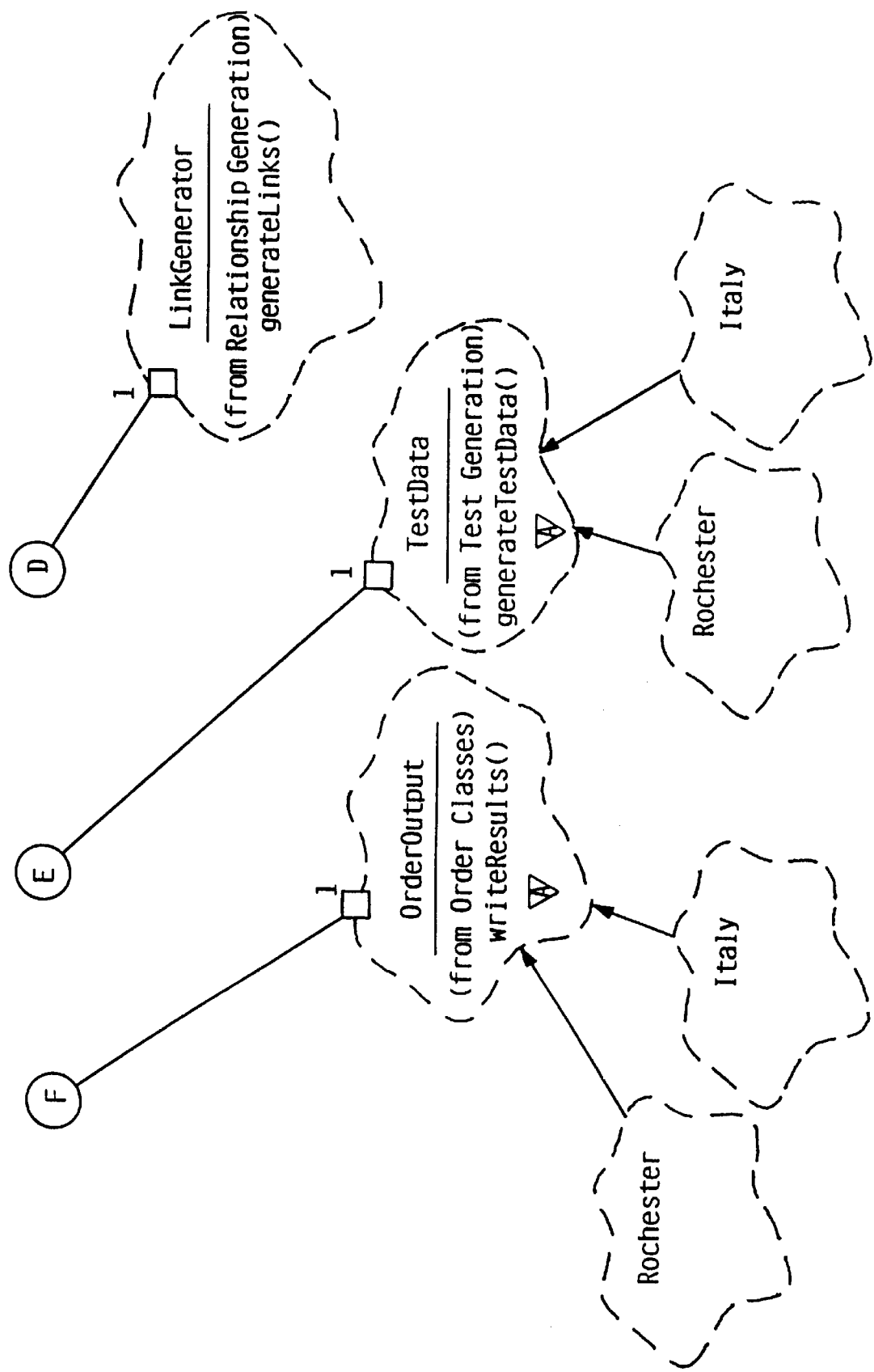
Figure 18A:
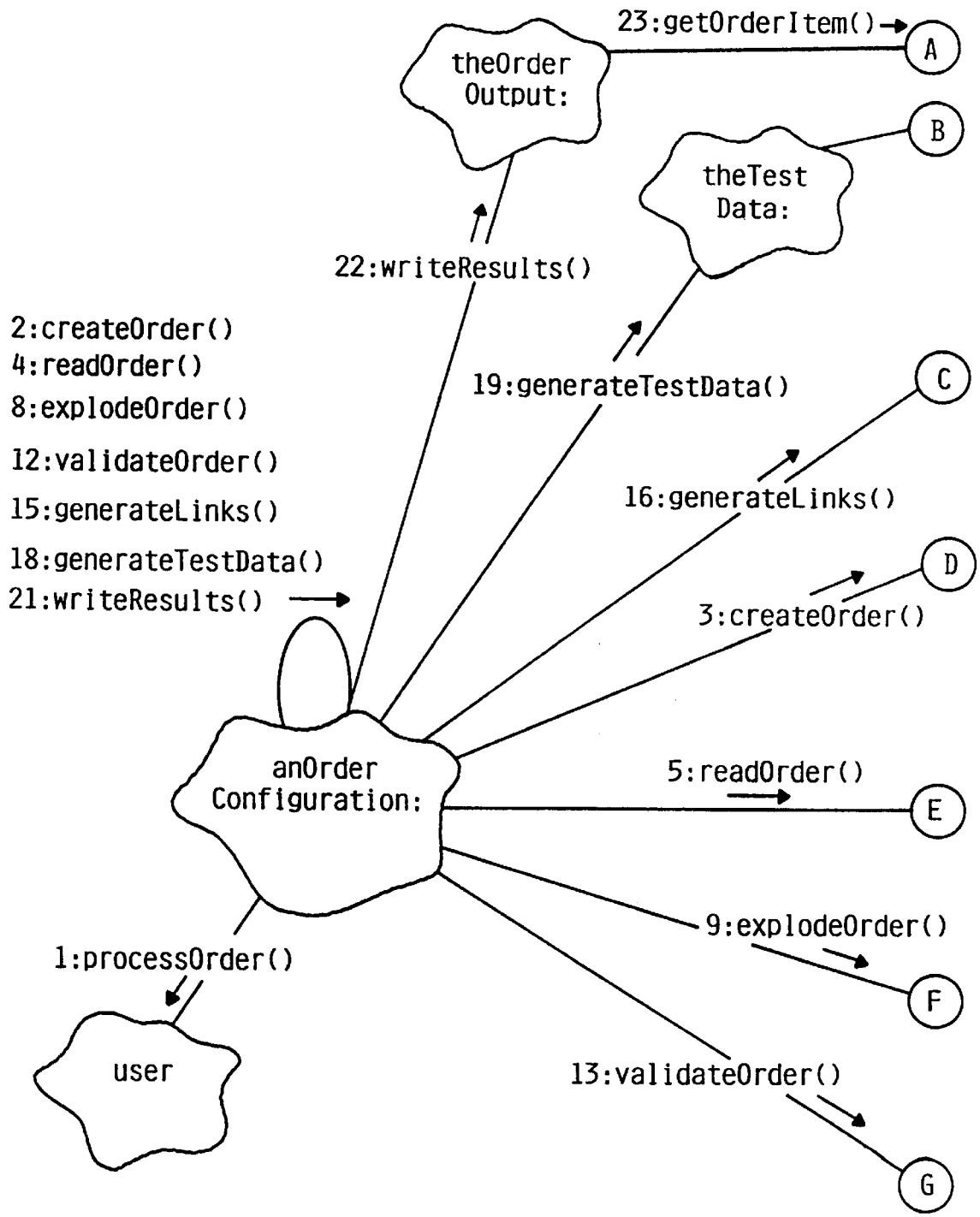
FIG. 18 is an object diagram of the Rochester configuration environment of FIG. 17.
Figure 18B:
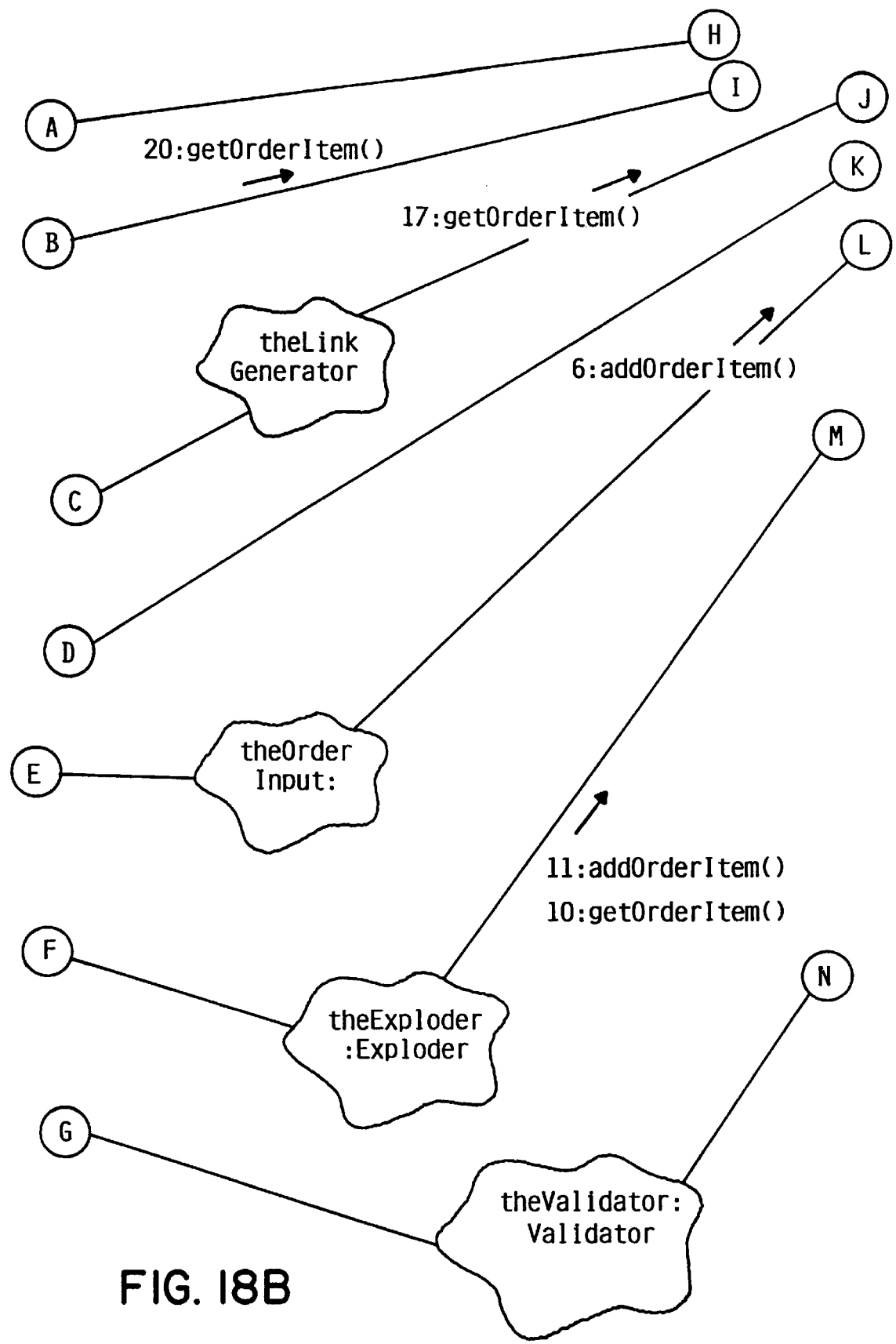
Figure 18C:
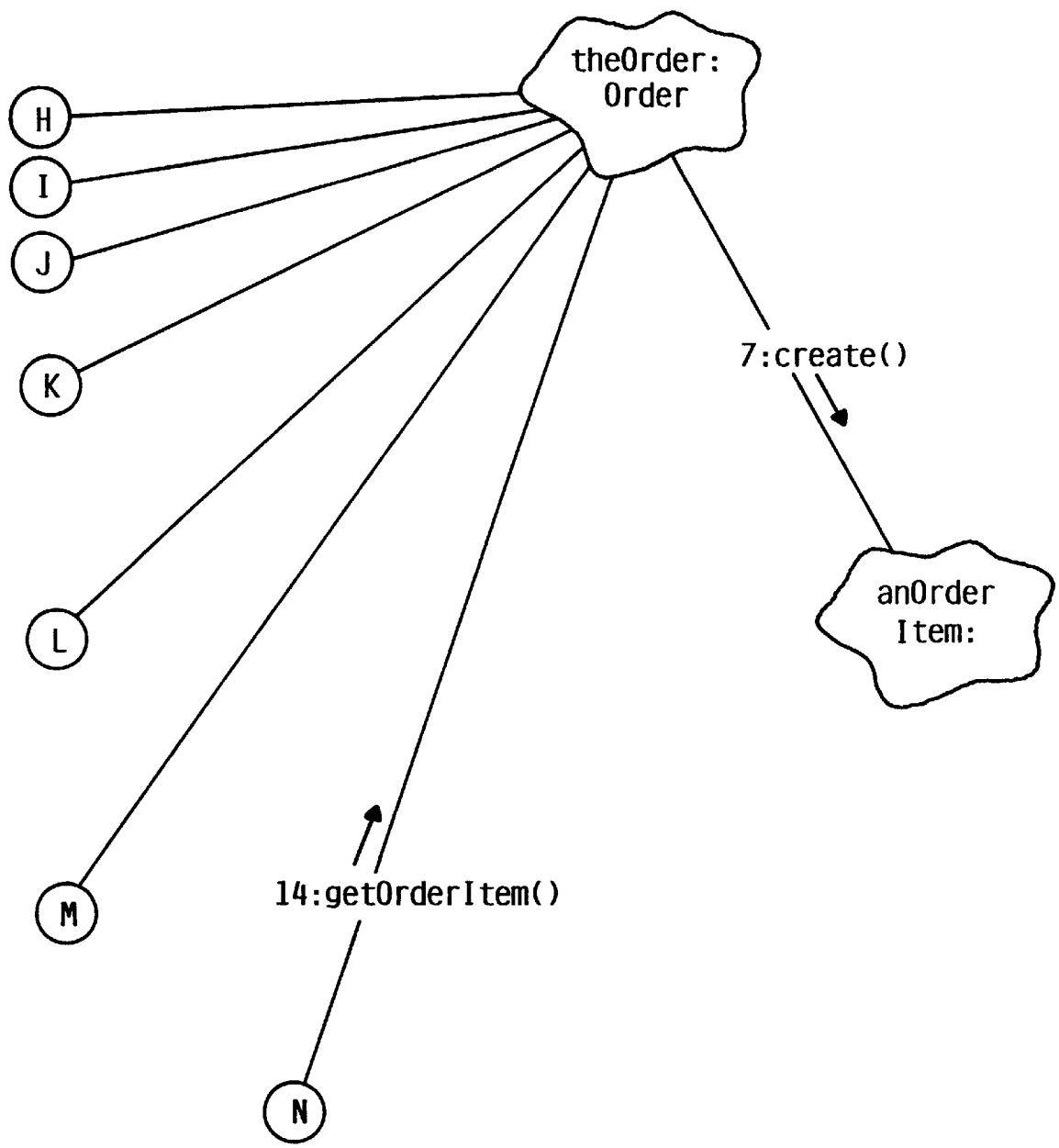
Figure 19A:
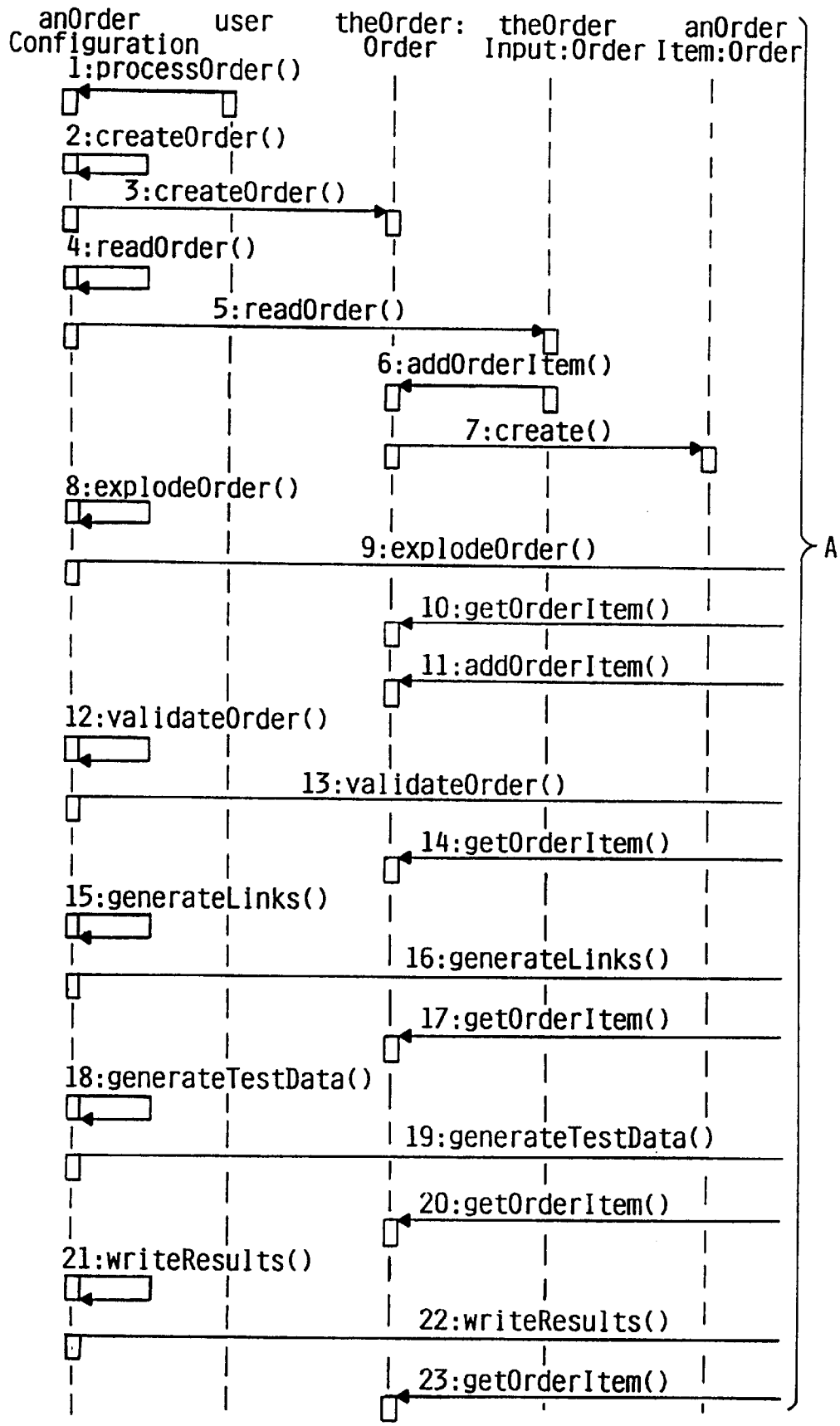
FIG. 19 is an interaction diagram of the Rochester configuration environment of FIG. 17.
Figure 19B:
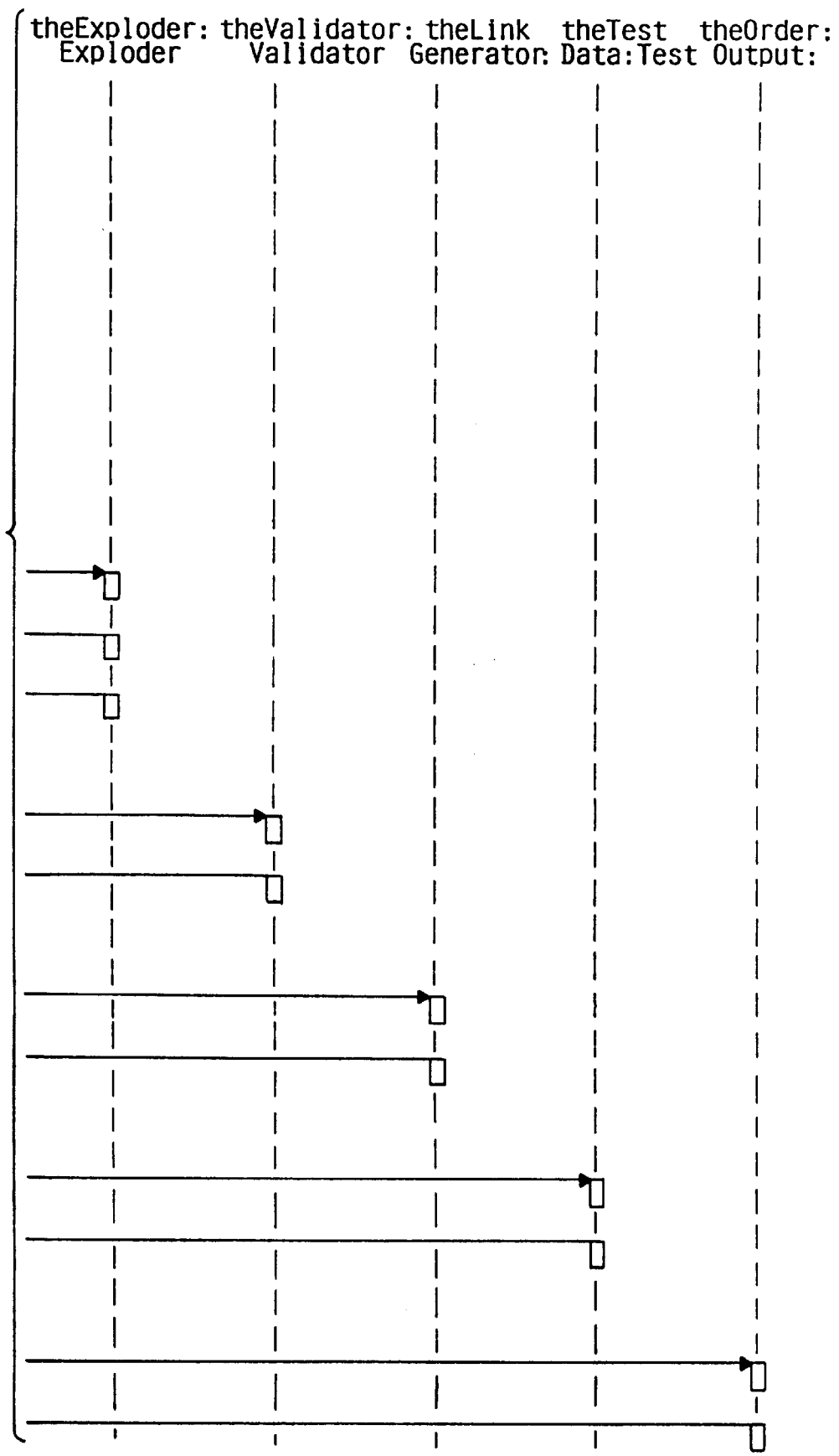

The operation of the framework of FIG. 11 may be best understood by the class diagram of FIG. 17, the object diagram of FIG. 18, and the interaction diagram of FIG. 19. Two different order processing environments, namely AS400HM9406 and RS6000SW are defined by subclassing from the Configuration Process class. The AS400HM9406 class represents an order processing environment for configuring the hardware on an AS/400 machine type 9406. The RS6000SW class represents an order processing environment for configuring the software on an RS/6000 machine. The OrderOutput class, the TestData class, and the OrderInput class all have subclasses called "Rochester" and "Italy", representing two different manufacturing sites. Assuming that Rochester and Italy each manufacture one or both of the AS/400 and RS/6000 computer systems, the framework as extended in FIG. 17 may be used to perform order processing for both of these production lines. Of course, many more order processing environments may be implemented with the framework. If an order processing environment has the same common features with a different environment that is already implemented in the framework, the new environment may use the same subclass without having to duplicate the effort to re-generate the code from scratch. For example, if a new order processing configuration was needed for Austin, and Austin uses the same OrderOutput mechanism and the same OrderInput mechanism as Rochester, but uses a unique Validator, implementing the Austin order processing environment will require programming the Validator subclass and the appropriate subclass to Configuration Process, but the OrderOutput and OrderInput mechanisms from Rochester may be re-used in the Austin order processing environment. From this we see the power and flexibility of providing a framework for order processing. In sum, the framework not only makes the programmer's job easier, but it also makes the code much more portable to other applications, and makes the code much easier to maintain.

The detailed operation of framework 870 in accordance with the present invention will now be illustrated with reference to the specific order processing environment shown in FIG. 18, which is an object diagram of one sample order processing environment (such as AS400HM9406 or RS6000SW of FIG. 17) that is generically entitled anOrderConfiguration. The function of the framework mechanism will now be described with reference to the specific methods referenced in FIGS. 18 and 19. A main program that uses the framework is represented by the user object, which invokes the framework by calling the processOrder( ) method of anOrderConfiguration. The processOrder( ) method defines the steps in method 900, and their order of execution. For the specific example in the figures, anOrderConfiguration is defined to initially create an order using the createOrder( ) method, to read the order using the readOrder( ) method, to explode the order using the explodeOrder( ) method, to validate the order using the validateOrder( ) method, to generate the relationships between order items using the generateLinks( ) method, to generate appropriate test results using the generateTestData( ) method, and to write the results of the processing of the order using the writeResults( ) method. Each of these methods are dummy methods that simply invoke their corresponding methods on the appropriate objects that are defined by subclasses to implement the desired order processing environment. The detailed steps of the sample order processing environment defined by the object diagram of FIG. 18 and the interaction diagram of FIG. 19 will now be described, recognizing that these two figures represent different ways of specifying the interaction between objects in a specific order processing environment.

Once the main program invokes the processOrder( ) method (step 1), anOrderConfiguration invokes its createOrder( ) method (step 2). This createOrder( ) method invokes the createOrder( ) method (step 3), which is a constructor for creating the object labeled theOrder:Order. Creating the order instantiates the object theOrder:Order, which defines a basic tree structure of order items for the order. Once theOrder:Order has been instantiated, anOrderConfiguration invokes its readOrder( ) method (step 4), which, in turn, invokes the readOrder( ) method of theOrderInput object (step 5). Next, theOrderInput invokes the addOrderItem( ) method of theOrder:Order object, which invokes the create( ) method on the object anOrderItem to create each order item in the order.

Next, anOrderConfiguration invokes its explodeOrder( ) method (step 8) which, in turn, invokes the explodeOrder( ) method of theExploder:Exploder object (step 9). The object theExploder:Exploder gets each order item one at a time using its getOrderItem( ) method (step 10), determines whether the order item needs to be exploded, and adds new order items that result from the explosion using its addOrderItem( ) method (step 11). Next, anOrderConfiguration performs validation of the order by invoking its validateOrder( ) method (step 12), which, in turn, invokes the validateOrder( ) method of theValidator:Validator object (step 13). To validate the order, theValidator:Validator invokes its getOrderItem method of theOrder:Order object to retrieve each order item from the order (step 14). Each item is then checked against a set of validation rules, such as determining co-requisites and conflicting order items.

Next, anOrderConfiguration invokes its generateLinks( ) method (step 15), which, in turn, invokes the generateLinks( ) method of theLinkGenerator object (step 16). The object theLinkGenerator generates the appropriate links in the order by retrieving each order item from the order using the getOrderItem( ) method of theOrder:Order method (step 17), and by determining which physical and logical links exist between order items. AnOrderConfiguration then invokes its generateTestData( ) method (step 18), which, in turn, invokes the generateTestData( ) method of theTestData object (step 19). This method invokes the getOrderItem( ) method of theOrder:Order object (step 20) to retrieve all the order items from the order, and determines what test data should be generated for each of the order items and for any combinations of order items. The final step for anOrderConfiguration invokes its writeResults( ) method (step 21), which, in turn, invokes the writeResults( ) method of theOrderOutput object (step 22). TheOrderOutput( ) retrieves each order item from theOrder:Order object by invoking its getOrderItem( ) method (step 23). TheOrderOutput then formats the order data into an appropriate file format, and writes the file to a location where the information may be used in the future. One example of a suitable output would format the order data into a predetermined expected format, then store the data into a database that may be accessed if the system is ever returned for service. The configuration of the system as returned may then be compared to the configuration of the system as manufactured to help locate defects. Once the writeResults( ) method (step 21) has completed writing the file results to the appropriate location, the processOrder( ) method is complete, and control is returned to the main program.

As the example above illustrates, the framework provides an extremely flexible and powerful tool for implementing any number of order processing environments by simply defining objects that implement the features specific to a particular order processing environment.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications,* 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labeled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_minute_timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "V" within an adornment triangle.

In addition to defining classes, a designer of an object oriented programming system must define objects (see page 136 of Booch). Objects are represented as solid line clouds within which is placed the object name located above a list of object attributes. An object is a tangible entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams convey the same information from that conveyed by object diagrams, but simply present the same information in a different format. The present specification makes use of both object diagrams (for the ZAF example) and interaction diagrams (for the description of the invention), and those skilled in the art will recognize that they are equivalent and also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

We claim:

1. A computer system, the computer system processing a plurality of orders for at least one production item, the computer system comprising:
    a central processing unit; and
    a memory coupled to the central processing unit;
    an object-oriented framework mechanism residing in the memory that provides at least one order processing environment, the framework mechanism executing on the central processing unit, the framework comprising:
    a user-extensible configuration process class, the configuration process class defining:
        at least one configuration process object corresponding to the at least one order processing environment; and
        a first set of object methods to perform a plurality of predetermined functions to create and process a plurality of orders in the order processing environment.

2. The computer system of claim 1 wherein the first set of object methods includes:
    at least one object method that creates at least one of the plurality of orders, each of the plurality of orders comprising a plurality of order items;
    at least one object method that reads at least one of the plurality of order items;
    at least one object method that explodes at least one of the plurality of orders into a list of order items that are included in the corresponding order;
    at least one object method that validates each of the plurality of order items;
    at least one object method that generates links between the plurality of order items; and
    at least one object method that generates test data corresponding to test data for at least one of the plurality of orders.

3. The computer system of claim 1 wherein the framework mechanism further comprises an order class and an order item class, the order item class defining:
    at least one order item object corresponding to at least one of a plurality of order items; and
    a second set of object methods to create at least one of the order items; the order class defining:
    at least one order object corresponding to at least one of the plurality of orders, each order object including a plurality of the order items; and
    a third set of object methods to retrieve at least one of the order items from at least one of the order objects.

4. The computer system of claim 1 wherein the framework mechanism comprises: an order input class, the order input class defining:
    at least one order input object; and
    a fourth set of object methods for reading at least one of the orders; an order output class, the order output class defining:
    at least one order output object; and
    a fifth set of object methods for outputting information regarding one of the orders after processing.

5. The computer system of claim 1 wherein each order comprises a plurality of order items, and wherein the framework mechanism comprises:
    an exploder class, the exploder class defining:
        at least one exploder object; and
        a sixth set of object methods for exploding at least one of the plurality of order items;
    a validator class, the validator class defining:
        at least one validator object; and
        a seventh set of object methods for validating each of the plurality of order items;
    a link generator class, the link generator class defining:
        at least one link generator object; and
        an eighth set of object methods for generating relationship links between selected order items;
    a test data class, the test data class defining:
        at least one test data object; and
        a ninth set of object methods for generating test data for each of the plurality of orders.

6. The computer system of claim 3 wherein the third set of object methods includes at least one object method that adds at least one of the order items to the order object.

7. The computer system of claim 3 wherein the order class and the order item class are core classes of the framework mechanism, the implementation of which cannot be changed by a user.

8. The computer system of claim 3 wherein the framework mechanism further comprises:
    an order input class, the order input class defining:
        at least one order input object; and
        a fourth set of object methods for reading at least one of the orders;
    an order output class, the order output class defining:
        at least one order output object; and
        a fifth set of object methods for outputting information regarding one of the orders after processing.

9. The computer system of claim 8 wherein the framework mechanism further comprises:
    an exploder class, the exploder class defining:
        at least one exploder object; and
        a sixth set of object methods for exploding at least one of the plurality of order items;
    a validator class, the validator class defining:
        at least one validator object; and
        a seventh set of object methods for validating each of the plurality of order items;
    a link generator class, the link generator class defining:
        at least one link generator object; and
        an eighth set of object method for generating relationship links between selected order items;
    a test data class, the test data class defining:
        at least one test data object; and
        a ninth set of object methods for generating test data for each of the plurality of orders.

10. The computer system of claim 9 wherein the order input class, the order output class, the exploder class, the validator class, the link generator class, and the test data class are extensible classes of the framework mechanism, the implementation of which by a user defines the at least one order processing environment.

11. The computer system of claim 9 wherein the configuration process class has a "has a" relationship with the order input class, the order output class, the exploder class, the validator class, the link generator class, and the test data class.

12. The computer system of claim 1 wherein the main memory contains an application program that supports an object oriented programming environment containing the framework mechanism, and wherein the framework mechanism is extended by providing information that implements the at least one order processing environment.

13. The computer system of claim 1 wherein the framework mechanism comprises:
at least one core function defined by at least one core class and by the relationships between a plurality of classes within the framework mechanism, wherein the implementation of the at least one core function is defined by the framework mechanism and cannot be modified by a user of the framework mechanism; and
at least one extensible function defined by at least one extensible class, wherein the implementation of the at least one extensible function is defined by the user of the framework mechanism by extending the at least one extensible class.

14. A method for processing a plurality of orders that each contain at least one order item, the method comprising the steps of:
providing an extensible object oriented framework mechanism that performs the processing of the plurality of orders according to extended portions of the framework mechanism that are customized by a user to provide a desired order processing environment;
extending the framework mechanism to define the desired order processing environment; and
executing the object oriented framework mechanism on a computer system to process the plurality of orders.

15. The method of claim 14 further including the steps of:
(a) generating a selected one of the plurality of orders;
(b) reading the order items corresponding to the selected order;
(c) generating links between the order items in the selected order; and
(d) outputting the selected order with the results of steps (a)–(c) above.

16. The method of claim 15 further including the steps of:
(e) exploding the selected order;
(f) validating the selected order; and
(g) generating test data for the selected order.

17. The method of claim 15 wherein the step of generating the selected order includes the steps of:
creating a new order;
reading all order items from an order input; and
adding the order items into the new order.

18. The method of claim 15 wherein the step of generating links includes the steps of:
reading the order items from the selected order;
determining the physical and logical relationships among the order items in the selected order; and
establishing links that represent the physical and logical relationships among the order items in the selected order.

19. The method of claim 15 wherein the step of outputting the selected order includes the step of writing the selected order with any test data and other associated information to a storage medium.

20. The method of claim 16 wherein the step of exploding the selected order includes the steps of:
reading the order items from the selected order;
determining from the order items read from the selected order whether any order items are needed but not included in the selected order; and
adding the needed order items into the selected order.

21. The method of claim 16 wherein the step of validating the selected order includes the steps of:
reading the order items from the selected order;
determining whether any of the order items read from the selected order conflict with any other of the order items;
determining whether any of the order items read from the selected order have co-requisites that are not present in the selected order; and
indicating a valid order if no conflicts exists and if all co-requisites are present in the selected order.

22. The method of claim 16 wherein the step of generating test data for the selected order includes the steps of:
reading the order items from the selected order; and
determining from the order items the test data that should result if the selected order is properly processed.

23. A program product comprising:
(A) an object-oriented framework mechanism for processing a plurality of orders, the framework mechanism including an extensible order processing mechanism that processes the plurality of orders according to extended portions of the framework mechanism, wherein the framework mechanism includes a configuration process object corresponding to the at least one order processing environment and a first set of object methods on the configuration process object to perform a plurality of predetermined functions to implement the order processing environment; and
(B) signal bearing media bearing the framework mechanism.

24. The program product of claim 23 wherein the signal bearing media comprises recordable media.

25. The program product of claim 23 wherein the signal bearing media comprises transmission media.

26. The program product of claim 23 wherein the first set of object methods includes:
at least one object method that creates at least one of the plurality of orders, each of the plurality of orders comprising a plurality of order items;
at least one object method that reads at least one of the plurality of order items;
at least one object method that explodes at least one of the plurality of orders;
at least one object method that validates each of the plurality of order items;
at least one object method that generates links between the plurality of order items; and
at least one object method that generates test data corresponding to test data for at least one of the plurality of orders.

27. The program product of claim 23 wherein the framework mechanism further comprises:
an order item object, the order item object including a second set of object methods to create at least one of the order items;
an order object, the order object corresponding to at least one of the plurality of orders, each order object including a plurality of the order items; and a third set of object methods to retrieve at least one of the order items from at least one of the order objects.

28. The program product of claim 23 wherein the framework mechanism further comprises:

an order input object including a fourth set of object methods for reading at least one of the orders;

an order output object including a fifth set of object methods for outputting information regarding one of the orders after processing.

29. The program product of claim 23 wherein the framework mechanism further comprises:

an exploder object including a sixth set of object methods for exploding at least one of the plurality of order items;

a validator object including a seventh set of object methods for validating each of the plurality of order items;

a link generator object including an eighth set of object methods for generating relationship links between selected order items;

a test data object including a ninth set of object methods for generating test data for each of the plurality of orders.

30. An extensible object oriented framework mechanism for use in a computer system that supports an object oriented programming environment, the extended framework mechanism comprising:

a configuration process object corresponding to the at least one order processing environment, the configuration process object including a first set of object methods on the configuration process object to perform a plurality of predetermined functions to implement the order processing environment;

an order item object, the order item object including a second set of object methods to create at least one of the order items;

an order object, the order object corresponding to at least one of the plurality of orders, each order object including a plurality of the order items and including a third set of object methods to retrieve at least one of the order items from at least one of the order objects;

an order input object including a fourth set of object methods for reading at least one of the orders;

an order output object including a fifth set of object methods for outputting information regarding one of the orders after processing;

an exploder object including a sixth set of object methods for exploding at least one of the plurality of order items;

a validator object including a seventh set of object methods for validating each of the plurality of order items;

a link generator object including an eighth set of object methods for generating relationship links between selected order items; and a test data object including a ninth set of object methods for generating test data for each of the plurality of orders.

31. The object oriented framework mechanism of claim 30 wherein the framework mechanism comprises:

at least one core function defined by relationships between a plurality of classes within the framework mechanism, wherein the implementation of the at least one core function is defined by the framework mechanism and cannot be modified by a user of the framework mechanism; and at least one extensible function defined by at least one extensible class, wherein the implementation of the at least one extensible function is defined by the user of the framework mechanism by extending the at least one extensible class.

32. A method for processing a plurality of orders that each contain at least one order item, the method comprising the steps of:

(1) providing an extensible object oriented framework mechanism for order processing;

(2) extending the framework mechanism to define a desired order processing environment, the extended framework mechanism comprising:

(2A) a configuration process object corresponding to the desired order processing environment, the configuration process object including a first set of object methods on the configuration process object to perform a plurality of predetermined functions to implement the desired order processing environment;

(2B) an order item object, the order item object including a second set of object methods to create at least one of the order items;

(2C) an order object, the order object corresponding to at least one of the plurality of orders, each order object including a plurality of the order items and including a third set of object methods to retrieve at least one of the order items from at least one of the order objects;

(2D) an order input object including a fourth set of object methods for reading at least one of the orders;

(2E) an order output object including a fifth set of object methods for outputting information regarding one of the orders after processing;

(2F) an exploder object including a sixth set of object methods for exploding at least one of the plurality of order items;

(2G) a validator object including a seventh set of object methods for validating each of the plurality of order items;

(2H) a link generator object including an eighth set of object methods for generating relationship links between selected order items; and (2I) a test data object including a ninth set of object methods for generating test data for each of the plurality of orders; and (3) executing the object oriented framework mechanism on a computer system to process at least one of the plurality of orders.

33. The method of claim 32 wherein the step of extending the framework mechanism includes the steps of:

selecting functions required by the desired order processing environment;

extending the framework mechanism to implement an object method within the first set of object methods that performs all the selected functions.

34. The method of claim 32 further including the steps of:

selecting at least one order item validation criterion for determining whether a selected order item is valid;

implementing the desired order processing environment by defining the extended portions in accordance with the at least one order item validation criterion.

35. The method of claim 32 further including the steps of:

selecting at least one exploder criterion for exploding a single order item into a plurality of order items;

the step of implementing the desired order processing environment further including the step of defining the extended portions in accordance with the selected at least one exploder criterion.

36. The method of claim 32 further including the steps of:
selecting at least one linking criterion for linking order items together within the order;
the step of implementing the desired order processing environment further including the step of defining the extended portions in accordance with the selected at least one linking criterion.

37. The method of claim 32 further including the steps of:
selecting at least one test data generation criterion for generating test data corresponding to at least one order item within the order;
the step of implementing the desired order processing environment further including the step of defining the extended portions in accordance with the selected at least one test data generation criterion.

38. A program product comprising:
an extensible object oriented framework mechanism for processing a plurality of orders, the extended framework mechanism including: a configuration process object corresponding to the at least one order processing environment, the configuration process object including a first set of object methods on the configuration process object to perform a plurality of predetermined functions to implement the order processing environment; an order item object, the order item object including a second set of object methods to create at least one of the order items; an order object, the order object corresponding to at least one of the plurality of orders, each order object including a plurality of the order items and including a third set of object methods to retrieve at least one of the order items from at least one of the order objects; an order input object including a fourth set of object methods for reading at least one of the orders; an order output object including a fifth set of object methods for outputting information regarding one of the orders after processing; an exploder object including a sixth set of object methods for exploding at least one of the plurality of order items; a validator object including a seventh set of object methods for validating each of the plurality of order items; a link generator object including an eighth set of object methods for generating relationship links between selected order items; and a test data object including a ninth set of object methods for generating test data for each of the plurality of orders; wherein the object oriented framework mechanism processes at least one of the plurality of orders according to extended portions of the framework mechanism that are customized to provide the desired order processing environment; and
(B) signal bearing media bearing the object oriented framework mechanism.

39. The program product of claim 38 wherein the signal bearing media comprises recordable media.

40. The program product of claim 38 wherein the signal bearing media comprises transmission media.

41. The program product of claim 38 wherein the order input class, the order output class, the exploder class, the validator class, the link generator class, and the test data class are extensible classes of the framework mechanism, the implementation of which by a user defines the at least one order processing environment.

42. The program product of claim 41 wherein the place class, the source filter class, the transfer condition class, and the target mapping class are extensible classes of the framework mechanism, the implementation of which by a user defines the at least one order processing environment.

43. An object oriented framework mechanism that processes a plurality of orders, the framework mechanism comprising:
at least one core function defined by relationships between a plurality of classes within the framework mechanism, wherein the implementation of the at least one core function is defined by the framework mechanism and cannot be modified by a user of the framework mechanism;
at least one extensible class wherein the implementation of the at least one extensible class is defined by the user of the framework mechanism, by extending the at least one extensible class, thereby defining at least one order processing environment;
a configuration process object corresponding to the at least one order processing environment, the configuration process object including a first set of object methods on the configuration process object to perform a plurality of predetermined functions to implement the order processing environment;
an order item object, the order item object including a second set of object methods to create at least one of the order items;
an order object, the order object corresponding to at least one of the plurality of orders, each order object including a plurality of the order items and including a third set of object methods to retrieve at least one of the order items from at least one of the order objects;
an order input object including a fourth set of object methods for reading at least one of the orders;
an order output object including a fifth set of object methods for outputting information regarding one of the orders after processing;
an exploder object including a sixth set of object methods for exploding at least one of the plurality of order items;
a validator object including a seventh set of object methods for validating each of the plurality of order items;
a link generator object including an eighth set of object methods for generating relationship links between selected order items; and
a test data object including a ninth set of object methods for generating test data for each of the plurality of orders.

44. The object oriented framework mechanism of claim 43 wherein the framework mechanism comprises a configuration process class, an order item class, an order class, an order input class, an order output class, an exploder class, a validator class, a link generator class, and a test data class, and wherein the configuration process class has a "has a" relationship with each of the order item class, the order class, the order input class, the order output class, the exploder class, the validator class, the link generator class, and the test data class.

45. The program product of claim 1 wherein the signal bearing media comprises recordable media.

46. The program product of claim 1 wherein the signal bearing media comprises transmission media.

47. A program product comprising:
(A) an extensible object oriented framework mechanism for processing a plurality of orders, the framework mechanism including at least one core function defined by relationships between a plurality of classes within the framework mechanism, wherein the implementation of the at least one core function is defined by the framework mechanism and cannot be modified by a user of the framework mechanism, the framework mechanism further including at least one extensible function defined by at least one extensible class, wherein the implementation of the at least one extensible class is defined by the user of the framework mechanism by extending the at least one extensible class, thereby defining a order processing environment that governs the operation of the framework mechanism, wherein the framework mechanism further comprises:

a configuration process object corresponding to the at least one order processing environment, the configuration process object including a first set of object methods on the configuration process object to perform a plurality of predetermined functions to implement the order processing environment;

an order item object, the order item object including a second set of object methods to create at least one of the order items;

an order object, the order object corresponding to at least one of the plurality of orders, each order object including a plurality of the order items and including a third set of object methods to retrieve at least one of the order items from at least one of the order objects;

an order input object including a fourth set of object methods for reading at least one of the orders;

an order output object including a fifth set of object methods for outputting information regarding one of the orders after processing;

an exploder object including a sixth set of object methods for exploding at least one of the plurality of order items;

a validator object including a seventh set of object methods for validating each of the plurality of order items;

a link generator object including an eighth set of object methods for generating relationship links between selected order items;

a test data object including a ninth set of object methods for generating test data for each of the plurality of orders;

wherein the object oriented framework mechanism performs the order processing according to extended portions of the framework mechanism that are customized to provide a desired order processing environment; and (B) signal bearing media bearing the object oriented framework mechanism.

* * * * *